(12) United States Patent
Kagawa et al.

(10) Patent No.: US 6,906,834 B1
(45) Date of Patent: *Jun. 14, 2005

(54) COLOR CONVERSION DEVICE AND METHOD OF MANUFACTURING THE SAME

(75) Inventors: Shuichi Kagawa, Tokyo (JP); Hiroaki Sugiura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 843 days.

This patent is subject to a terminal disclaimer.

(21) Appl. No.: 09/689,653

(22) Filed: Oct. 13, 2000

(30) Foreign Application Priority Data

Oct. 14, 1999 (JP) .......................................... 11-291897

(51) Int. Cl.⁷ .............................................. G03F 3/08
(52) U.S. Cl. ...................... 358/518; 358/500; 358/520; 358/523; 382/162; 382/167
(58) Field of Search ................................ 358/500, 518, 358/520, 523; 382/162, 167

(56) References Cited

U.S. PATENT DOCUMENTS

| | | | |
|---|---|---|---|
| 4,740,833 A | | 4/1988 | Shiota et al. |
| 4,887,150 A | * | 12/1989 | Chiba et al. ................. 358/523 |
| 4,989,079 A | * | 1/1991 | Ito .............................. 358/520 |
| 5,436,733 A | | 7/1995 | Terada et al. |
| 5,588,050 A | * | 12/1996 | Kagawa et al. .............. 382/167 |
| 5,659,406 A | | 8/1997 | Imao et al. |
| 5,729,636 A | | 3/1998 | Kagawa |
| 5,933,252 A | * | 8/1999 | Emori et al. ................. 358/500 |
| 6,434,268 B1 | * | 8/2002 | Asamura et al. ............ 382/162 |
| 6,549,653 B1 | * | 4/2003 | Osawa et al. ............... 382/162 |
| 6,621,497 B1 | * | 9/2003 | Sugiura et al. ............. 345/600 |

FOREIGN PATENT DOCUMENTS

| | | |
|---|---|---|
| EP | 1 028 586 A3 | 8/2000 |
| JP | 6339188 | 8/1988 |
| JP | 63227181 | 9/1988 |
| JP | 230226 | 7/1990 |
| JP | 548885 | 2/1993 |
| JP | 5-183742 | 7/1993 |
| JP | 7-023245 | 1/1995 |
| JP | 7170404 | 7/1995 |
| JP | 8-321964 | 12/1996 |
| JP | 11-17974 | 1/1999 |

* cited by examiner

*Primary Examiner*—Mark Wallerson
*Assistant Examiner*—Michael Burleson
(74) *Attorney, Agent, or Firm*—Birch, Stewart, Kolasch & Birch, LLP

(57) ABSTRACT

Responsive to image data of three colors, six hue data are obtained, and then first comparison-result data each relating to one of the six hues, and second comparison-result data each relating to one of the six inter-hue areas are obtained. Matrix calculation is performed on the first comparison-result data, and the second comparison-result data, using coefficients. By varying the coefficients, adjustment can be made to only the target hue or inter-hue area, without affecting other hues and inter-hue areas. Thus, the six hues and six inter-hue areas can be varied independently, and the large-capacity memory is not required. The coefficients used for the matrix calculation are stored in a storage, which can be set and altered by the use of a setting unit.

28 Claims, 19 Drawing Sheets

| IDENTIFICATION CODE S1 | MAXIMUM VALUE β | MINIMUM VALUE α | HUE DATA OF A VALUE ZERO |
|---|---|---|---|
| 0 | Ri | Gi | g,c |
| 1 | Ri | Bi | b,c |
| 2 | Gi | Ri | r,m |
| 3 | Gi | Bi | b,m |
| 4 | Bi | Ri | r,y |
| 5 | Bi | Gi | g,y |

* $r=Ri-\alpha, g=Gi-\alpha, b=Bi-\alpha$
$y=\beta-Bi, m=\beta-Gi, c=\beta-Ri$

| IDENTIFICATION CODE S1 | Q1 | Q2 | P1 | P2 |
|---|---|---|---|---|
| 0 | r | b | m | y |
| 1 | r | g | y | m |
| 2 | g | b | c | y |
| 3 | g | r | y | c |
| 4 | b | g | c | m |
| 5 | b | r | m | c |

FIG. 10A

| HUE | EFFECTIVE FIRST COMPARISON-RESULT DATA |
|---|---|
| RED | h1r |
| GREEN | h1g |
| BLUE | h1b |
| CYAN | h1c |
| MAGENTA | h1m |
| YELLOW | h1y |

FIG. 10B

| INTER-HUE AREA | EFFECTIVE SECOND COMPARISON-RESULT DATA |
|---|---|
| RED-YELLOW | h2ry |
| YELLOW-GREEN | h2gy |
| GREEN-CYAN | h2gc |
| CYAN-BLUE | h2bc |
| BLUE-MAGENTA | h2bm |
| MAGENTA-RED | h2rm |

COLOR CONVERSION DEVICE AND METHOD OF MANUFACTURING THE SAME

BACKGROUND OF THE INVENTION

The present invention relates to data processing used for a full-color printing related equipment such as a printer, a video printer, a scanner or the like, an image processor for forming computer graphic images or a display device such as a monitor. More specifically, the invention relates to a color conversion device for performing color conversion from image data in the form of a first set of three color data of red, green and blue, or cyan, magenta and yellow, to a second set of three color data of red, green and blue, or cyan, magenta and yellow. The invention also relates to a method of manufacturing the color conversion device.

Color conversion in printing is an indispensable technology for compensating deterioration of image quality due to color mixing property due to the fact that the ink is not of a pure color, or the non-linearity (in the hue) of the image-printing, and to output a printed image with a high color reproducibility. Also, in a display device such as a monitor or the like, color conversion is performed in order to output (display) an image having desired color reproducibility in accordance with conditions under which the device is used or the like when an inputted color signal is to be displayed.

Conventionally, two methods have been available for the foregoing color conversion: a table conversion method and a matrix calculation method.

A representative example of the table conversion method is a three-dimensional look-up table method, in which the image data represented by red, green and blue (hereinafter referred to as R, G, and B) are input, to output an image data of R, G, and B stored in advance in a memory, such as a ROM, or complementary color data of yellow, cyan and magenta (hereinafter referred to as Y, M, and C). Because any desired conversion characteristics can be achieved, color conversion with a good color reproducibility can be performed.

However, in a simple structure for storing data for each combination of image data, a large-capacity memory of about 400 Mbit must be used. For example, even in the case of a compression method for memory capacity disclosed in Japanese Patent Kokai Publication No. S63-227181, memory capacity is about 5 Mbit. Therefore, a problem inherent in the table conversion system is that since a large-capacity memory is necessary for each conversion characteristic, it is difficult to implement the method by means of an LSI, and it is also impossible to deal with changes in the condition under which the conversion is carried out.

On the other hand, in the case of the matrix calculation method, for example, for obtaining printing data of Y, M and C from image data of R, G and B, the following formula (11) is used as a basic calculation formula.

$$\begin{bmatrix} Y \\ M \\ C \end{bmatrix} = (Aij) \begin{bmatrix} R \\ G \\ B \end{bmatrix} \quad (11)$$

Here, Aij represents coefficients, with i=1 to 3, and j=1 to 3.

However, by the simple linear calculation of the formula (11), it is impossible to provide a good conversion characteristic because of a non-linearity of an image-printing or the like.

A method has been proposed for providing a conversion characteristic to improve the foregoing characteristic. This method is disclosed in Japanese Patent Application Kokoku Publication H2-30226, directed to a color correction calculation device, and employs a matrix calculation formula (12) below.

$$\begin{bmatrix} Y \\ M \\ C \end{bmatrix} = (Dij) \begin{bmatrix} R \\ G \\ B \\ R*G \\ G*B \\ B*R \\ R*R \\ G*G \\ B*B \\ N \end{bmatrix} \quad (12)$$

Here, N is a constant, i=1 to 3, and J=1 to 10.

In the foregoing formula (12), since image data having a mixture of an achromatic component and a color component is directly used, mutual interference occur in computation. In other words, if one of the coefficients is changed, influence is given to the components or hues other than the target component or hue (the component or hue for which the coefficient is changed). Consequently, a good conversion characteristic cannot be realized.

A color conversion method disclosed in Japanese Patent Application Kokai Publication H7-170404 is a proposed solution to this problem. FIG. 19 is a block circuit diagram showing the color conversion method for conversion of image data of R, G and B into printing data of C, M and Y, disclosed in Japanese Patent Application Kokai Publication H7-170404. In the drawing, reference numeral 100 denotes a complement calculator; 101, a minimum and maximum calculator; 102, a hue data calculator; 103, a polynomial calculator; 104, a matrix calculator; 105, a coefficient generator; and 106, a synthesizer.

Next, the operation will be described. The complement calculator 100 receives image data R, G and B, and outputs complementary color data Ci, Mi and Yi which have been obtained by determining 1's complements.

The determination of 1's complement of an input data can be achieved by subtracting the value of the input data of n bits (n being an integer) from $(2^n-1)$. For example, in the case of 8-bit data, the value of the input data is deducted from "255".

The minimum and maximum calculator 101 outputs a maximum value $\beta$ and a minimum value $\alpha$ of this complementary color data and an identification code S for indicating, among the six hue data, data which are zero.

The hue data calculator 102 receives the complementary color data Ci, Mi and Yi and the maximum and minimum values $\beta$ and $\alpha$, and outputs six hue data r, g, b, y, m and c which are obtained by executing the following subtraction:

$r=\beta-Ci$, $g=\beta-Mi$, $b=\beta-Yi$, $y=Yi-\alpha$, $m=Mi-\alpha$, and $c=Ci-\alpha$.

Here, among the six hue data, at least two assume the value zero.

The polynomial calculator 103 receives the hue data and the identification code S, selects, from r, g and b, two data Q1 and Q2 which are not zero and, from y, m and c, two data P1 and P2 which are not zero. Based on these data, the polynomial calculator 103 computes polynomial data:

$T1=P1*P2$, $T3=Q1*Q2$, $T2=T1/(P1+P2)$, and $T4=T3/(Q1+Q2)$, and then outputs the results of the calculation.

It is noted that asterisks "*" are sometimes used in this specification to indicate multiplication.

The coefficient generator 105 generates calculation coefficients U(Fij) and fixed coefficients U(Eij) for the polynomial data based on information of the identification code S. The matrix calculator 104 receives the hue data y, m and c, the polynomial data T1 to T4 and the coefficients U, and outputs the result of the following formula (13) as color ink data C1, M1 and Y1.

$$\begin{bmatrix} C1 \\ M1 \\ Y1 \end{bmatrix} = (Eij)\begin{bmatrix} c \\ m \\ y \end{bmatrix} + (Fij)\begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \end{bmatrix} \quad (13)$$

The synthesizer 106 adds together the color ink data C1, M1 and Y1 and data a which is the achromatic data, and outputs printing data C, M and Y. Accordingly, the following formula (14) is used for obtaining printing data.

$$\begin{bmatrix} C \\ M \\ Y \end{bmatrix} = (Eij)\begin{bmatrix} c \\ m \\ y \end{bmatrix} + (Fij)\begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \end{bmatrix} + \begin{bmatrix} \alpha \\ \alpha \\ \alpha \end{bmatrix} \quad (14)$$

The formula (14) shows a general formula for a group of pixels.

FIG. 20A to FIG. 20F, which are schematic diagrams, show relations between six hues of red (R), green (G), blue (B), yellow (Y), cyan (C) and magenta (M), and hue data y, m, c, r, g and b. As shown, each hue data relates to three hues (i.e., extends over the range of three hues). For instance the hue data c relates to the hues g, c and b.

FIG. 21A to FIG. 21F, which are schematic diagrams, show relations between the six hues and product terms y*m, r*g, c*y, g*b, m*c and b*r.

As shown, each of the six product terms y*m, m*c, c*y, r*g, g*b and b*r in the formula (14) relates to only one hue among the six hues of red, blue, green, yellow, cyan and magenta. That is, only y*m is an effective product term for red; m*c for blue; c*y for green; r*g for yellow; g*b for cyan; and b*r for magenta.

Also, each of the six fraction terms y*m/(y+m), m*c/(m+c), c*y/(c+y), r*g/(r+g), g*b/(g+b) and b*r/(b+r) in the formula (14) relates to only one hue among the six hues.

As apparent from the foregoing, according to the color conversion method shown in FIG. 19, by changing coefficients for the product terms and the fraction terms regarding the specific hue, only the target hue can be adjusted without influencing other hues.

Each of the foregoing product terms is determined by a second-order computation for chroma, and each of the fraction terms is determined by a first-order computation for chroma. Thus, by using both of the product terms and the fraction terms, the non-linearity of an image-printing for chroma can be adjusted.

However, this color conversion method cannot satisfy a certain desire. That is, depending on the user's preference, if an area in a color space occupied by specific hues is to be expanded or reduced, e.g., specifically, if expansion or reduction in an area of red in a color space including magenta, red and yellow is desired, the conventional color conversion method of the matrix computation type could not meet such a desire.

The problems of the conventional color conversion method or color conversion device are summarized as follows. Where the color conversion device is of a three-dimensional look-up table conversion method employing a memory such as ROM, a large-capacity memory is required, and a conversion characteristic cannot be flexibly changed. Where the color conversion device is of a type using a matrix calculation method, although it is possible to change only a target hue, it is not possible to vary the color in the inter-hue areas between adjacent ones of the six hues of red, blue, green, yellow, cyan and magenta, and good conversion characteristics cannot be realized throughout the entire color space.

SUMMARY OF THE INVENTION

The present invention was made to solve the foregoing problems.

An object of the present invention is to provide a color conversion device and a color conversion method for performing color-conversion wherein independent adjustment is performed not only for, six hues of red, blue, green, yellow, cyan and magenta but also six inter-hue areas of red-yellow, yellow-green, green-cyan, cyan-blue, blue-magenta and magenta-red, and a conversion characteristic can be flexibly changed, and no large-capacity memories, such as three-dimensional look-up tables, are necessary.

According to a first aspect of the invention, there is provided a color conversion device for performing pixel-by-pixel color conversion from a first set of three color data representing red, green and blue, or cyan, magenta and yellow, into a second set of three color data representing red, green and blue, or cyan, magenta, and yellow, said device comprising:

first calculation means for calculating a minimum value $\alpha$ and a maximum value $\beta$ of said first set of three color data for each pixel;

hue data calculating means for calculating hue data r, g, b, y, m and c based on said first set of three color data, and said minimum and maximum values α and β outputted from said calculating means;

means for generating first comparison-result data based on the hue data outputted from said hue data calculating means;

means for generating second comparison-result data based on said first comparison-result data;

coefficient storage means for storing matrix coefficients for the hue data, the first comparison-result data and the second comparison-result data;

coefficient setting means for setting specified matrix coefficients in said coefficient storage means; and second calculation means responsive to said hue data, said first comparison-result data, said second comparison-result data, and the coefficients from said coefficient storage means for calculating said second set of three color data representing red, green and blue, or cyan, magenta, and yellow, said second calculation means performing calculation including matrix calculation performed at least on said hue data, said first comparison-result data, said second comparison-result data, and the coefficients from said coefficient storage means.

With the above arrangement, it is possible to independently vary not only the colors of the six hues of red, blue, green, yellow, cyan and magenta, but also the colors in the six inter-hue areas of red-yellow, yellow-green, green-cyan, cyan-blue, blue-magenta, and magenta-red, by independently setting the coefficients relating to the target hue or inter-hue area. Accordingly, it is possible to obtain color conversion methods or color conversion devices which can change the conversion characteristics flexibly, without requiring a large-capacity memory.

Moreover, by making it possible to set the coefficients by the use of the coefficient setting means, it is possible to obtain color reproducibility taking into consideration the characteristics of the output device or the input device with which the color conversion device of the invention is to be used or the color conversion characteristics preferred by the user. The coefficients can be set freely by the user, so as to alter the color reproducibility. This is a significant advantage because different users prefer different color reproducibilities.

The color reproducibility can also be altered when a three-dimensional look-up table is used as in the prior art. However, because a large amount of data, e.g., 5 Mbit, needs to be set, the setting requires considerable time. For instance, if the clock-frequency is 5 MHz, and the data is set using a three-wire serial interface, at least about one second is required. In contrast, according to the invention, the amount of data that needs to be set is several hundred bits. The time required for the setting is at most about 100 microseconds.

A real-time man-machine interface can be therefore achieved, in which the color conversion characteristics are changed a little by little, and the result of the change is observed, until a desired characteristics are obtained.

In the process of manufacturing the display device for displaying the color image, by providing the color conversion device according to the invention in order to absorb the manufacturing variations in the color reproducibility of a liquid crystal display panel of a liquid crystal display device, it is possible to set the coefficients necessary to compensate for the manufacturing variations in a coefficient storage, e.g., a read-only memory, in a short time.

Accordingly, the color conversion device according to the invention is appropriate from the view-point of mass production.

Moreover, because the second comparison-result data calculated from the first comparison-result data are used as calculation term relating to the inter-hue areas in the matrix calculation, the number of calculation steps required can be reduced than if they are calculated from the hue data r, g, b, y, m, c.

It may be so configured that said second calculation means performs said matrix calculation on said hue data, said first comparison-result data, said second comparison-result data, and the coefficients from said coefficient storage means, and further includes synthesizing means for adding said minimum value a from said first calculation means to the results of said matrix calculation.

It may be so configured that said coefficient storage means outputs predetermined matrix coefficients Eij (i=1 to 3, j=1 to 3), and Fij (i=1 to 3, j=1 to 12), and said second calculation means performs the calculation using the hue data, said said first comparison-result data, said second comparison-result data, said minimum value a from said calculating means, and said matrix coefficients to determine said second set of three color data representing red, green and blue, denoted by Ro, Go and Bo, in accordance with the following formula (1):

$$\begin{bmatrix} Ro \\ Go \\ Bo \end{bmatrix} = (Eij) \begin{bmatrix} r \\ g \\ b \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \end{bmatrix} + \begin{bmatrix} \alpha \\ \alpha \\ \alpha \end{bmatrix} \quad (1)$$

wherein h1r, h1g, h1b, h1c, h1m and h1y denote said first comparison-result data, and h2ry, h2rm, h2gy, h2gc, h2bm and h2bc denote said second comparison result data.

It may be so configured that said coefficient storage means outputs predetermined matrix coefficients Eij (i=1 to 3, j=1 to 3), and Fij (i=1 to 3, j=1 to 12), and said second calculation means performs the calculation using the hue data, said said first comparison-result data, said second comparison-result data, said minimum value a from said calculating means, and said matrix coefficients to determine said second set of three color data representing cyan, magenta and yellow denoted by Co, Mo and Yo, in accordance with the following formula (2):

$$\begin{bmatrix} Co \\ Mo \\ Yo \end{bmatrix} = (Eij) \begin{bmatrix} c \\ m \\ y \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \end{bmatrix} + \begin{bmatrix} \alpha \\ \alpha \\ \alpha \end{bmatrix} \quad (2)$$

wherein h1r, h1g, h1b, h1c, h1m and h1y denote said first comparison-result data, and h2ry, h2rm, h2gy, h2gc, h2bm and h2bc denote said second comparison result data.

It may be so configured that said second calculation means performs said matrix calculation on said hue data, said first comparison-result data, said second comparison-result data, the coefficients from said coefficient storage means, and said minimum value α from said first calculation means.

It may be so configured that
said coefficient storage means outputs predetermined matrix coefficients Eij (i=1 to 3, j=1 to 3), and Fij (i=1 to 3, j=1 to 13), and
said second calculation means performs the calculation using the hue data, said said first comparison-result data, said second comparison-result data, said minimum value α from said calculating means, and said matrix coefficients to determine said second set of three color data representing red, green and blue, denoted by Ro, Go and Bo, in accordance with the following formula (3):

$$\begin{bmatrix} Ro \\ Go \\ Bo \end{bmatrix} = (Eij) \begin{bmatrix} r \\ g \\ b \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (3)$$

wherein h1r, h1g, h1b, h1c, h1m and h1y denote said first comparison-result data, and h2ry, h2rm, h2gy, h2gc, h2bm and h2bc denote said second comparison result data.

It may be so configured that
said coefficient storage means outputs predetermined matrix coefficients Eij (i=1 to 3, j=1 to 3), and Fij (i=1 to 3, j=1 to 13), and
said second calculation means performs the calculation using the hue data, said said first comparison-result data, said second comparison-result data, said minimum value a from said calculating means, and said matrix coefficients to determine said second set of three color data representing cyan, magenta and yellow denoted by Co, Mo and Yo, in accordance with the following formula (4):

$$\begin{bmatrix} Co \\ Mo \\ Yo \end{bmatrix} = (Eij) \begin{bmatrix} c \\ m \\ y \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (4)$$

wherein h1r, h1g, h1b, h1c, h1m and h1y denote said first comparison-result data, and h2ry, h2rm, h2gy; h2gc, h2bm and h2bc denote said second comparison result data.

It may be so configured that
said first set of three color data represent red, green and blue,
said second set of three color data represent red, green and blue, and
said hue data calculation means calculates the hue data r, g, b, y, m, c by subtraction in accordance with:

$r=Ri-\alpha,$ $g=Gi-\alpha,$ $b=Bi-\alpha,$ $y=\beta-Bi,$ $m=\beta-Gi,$ and $c=\beta-Ri,$ wherein Ri, Gi and Bi represent said first set of three color data.

It may be so configured that
said first set of three color data represent cyan, magenta and yellow,
said second set of three color data represent red, green and blue,
said device further comprises means for determining complement of said first set of three color data, and
said hue data calculation means calculates the hue data r, g, b, y, m, c by subtraction in accordance with:

$r=Ri-\alpha,$ $g=Gi-\alpha,$ $b=Bi-\alpha,$ $y=\beta-Bi,$ $m=\beta-Gi,$ and $c=\beta-Ri,$ wherein Ri, Gi and Bi represent data produced by the determination of the complement of said first set of three color data.

It may be so configured that said first set of three color data represent cyan, magenta and yellow, said second set of three color data represent cyan, magenta and yellow, and said hue data calculation means calculates the hue data r, g, b, y, m, c by subtraction in accordance with:

$r=\beta-Ci,$ $g=\beta-Mi,$ $b=\beta-Yi,$ $y=Yi-\alpha,$ $m=Mi-\alpha,$ and $c=Ci-\alpha,$ wherein Ci, Mi and Yi represent said first set of three color data.

It may be so configured that said first set of three color data represent red, green and blue, said second set of three color data represent cyan, magenta and yellow, said device further comprises means for determining complement of said first set of three color data, and said hue data calculation means calculates the hue data r, g, b, y, m, c by subtraction in accordance with:

$r=\beta-Ci,$ $g=\beta-Mi,$ $b=\beta-Yi,$ $y=Yi-\alpha,$ $m=Mi-\alpha,$ and $c=Ci-\alpha.$ wherein Ci, Mi and Yi represent data produced by the determination of the complement of said first set of three color data.

With the above arrangement, the hue data calculating means can be configured of means for performing subtraction based on the input image of red, green and blue, or cyan, magenta and yellow and the maximum value β and minimum value α from the first calculation means.

It may be so configured that said first comparison-result data generating means determines the comparison-result data among the hue data r, g and b, and the comparison-result data among the hue data y, m and c, and said second comparison-result data generating means comprises multiplying means for multiplying the first comparison-result data outputted from said first comparison-result data generating means with specific calculation coefficients, and means for determining the comparison-result data based on the outputs of said multiplication means.

With the above arrangement, the first comparison-result data generating means and the second comparison-result data generating means are configured of means for performing comparison, and means for performing multiplication.

It may be so configured that said first comparison-result data generating means determines the first comparison-result data:

$h1r=\min(m,y),$ $h1g=\min(y,c),$ $h1b=\min(c,m),$ $h1c=\min(g,b),$ $h1m=\min(b,r),$ and $h1y=\min(r,g),$ (with min (A, B) representing the minimum value of A and B), said second comparison-result data generating means determines the second comparison-result data:

$h2ry=\min(aq1*h1y,ap1*h1r),$ $h2rm=\min(aq2*h1m,ap2*h1r),$ $h2gy=\min(aq3*h1y,ap3*h1g),$ $h2gc=\min(aq4*h1c,ap4*h1g),$ $h2bm=\min(aq5*h1m,ap5*h1b),$ and $h2bc=\min(aq6*h1c,ap6h1m).$ With the above arrangement, the first comparison-result data generating means can be configured of means for performing minimum value selection, and the second comparison-result data can be configured of means for performing multiplication and means for performing minimum value selection.

It may be so configured that said multiplying means in said second comparison-result data generating means performs calculation on said first comparison result-data and said calculation coefficients by setting said calculation coefficients aq1 to aq6 and ap1 to ap6 to integral values of $2^n$, with n being an integer, and by bit shifting.

With the above arrangement, the multiplication can be carried out by means of bit shifting.

It may be so configured that each of said first comparison-result data is determined from two of the hue data and is effective for only one of the six hues of red, green, blue, cyan, magenta and yellow.

With the above arrangement, each of the six hues can be adjusted by varying the coefficients for the first comparison-result data without influencing other hues.

It may be so configured that each of said second comparison-result data is determined from two of the first comparison-result data and is effective for only one of the six inter-hue areas of red-yellow, yellow-green, green-cyan, cyan-blue, blue-magenta, and magenta-red.

With the above arrangement, each of the six inter-hue areas can be adjusted by varying the coefficients for the second comparison-result data without influencing other inter-hue areas.

It may be so configured that said coefficient storage means outputs specified matrix coefficients Eij (i=1 to 3, j=1 to 3) based on a formula (5) below:

$$(Eij) = \begin{bmatrix} 1 & 0 & 0 \\ 0 & 1 & 0 \\ 0 & 0 & 1 \end{bmatrix} \quad (5)$$

With the above arrangement, it is not necessary to multiply the coefficients with the hue data and yet adjustment can be made only to the target hue or inter-hue area (among the six hues of red, blue, green, yellow, cyan, and magenta, and six inter-hue areas), without influencing other hues or inter-hue areas.

It may be so configured that said first calculation means calculates a maximum value $\beta$ and a minimum value $\alpha$ using said first set of three color data, and generates an identification code indicating the hue data which is of a value zero, and said coefficient storage means outputs said matrix coefficients based on the identification code outputted from said first calculation means, and said second calculation means performs matrix calculation using the coefficient from said coefficient storage means to produce the second set of three color data based on the identification code outputted from said first calculation means.

With the above arrangement, the number of steps for performing the matrix calculation can be reduced.

According to another aspect of the invention, there is provided a method of manufacturing a color conversion device which is for use with an input or output device and which performs pixel-by-pixel color conversion from a first set of three color data representing red, green and blue, or cyan, magenta and yellow, into a second set of three color data representing red, green and blue, or cyan, magenta, and yellow, said color conversion device comprising:

first calculation means for calculating a minimum value $\alpha$ and a maximum value $\beta$ of said first set of three color data for each pixel;

hue data calculating means for calculating hue data r, g, b, y, m and c based on said first set of three color data, and said minimum and maximum values $\alpha$ and $\beta$ outputted from said calculating means;

means for generating first comparison-result data based on the hue data outputted from said hue data calculating means;

means for generating second comparison-result data based on said first comparison-result data;

coefficient storage means for storing coefficients for the hue data, the first comparison-result data and the second comparison-result data; and second calculation means responsive to said hue data, said first comparison-result data, said second comparison-result data, and the coefficients from said coefficient storage means for calculating said second set of three color data representing red, green and blue, or cyan, magenta, and yellow, said second calculation means performing calculation including matrix calculation performed at least on said hue data, said first comparison-result data, said second comparison-result data, and the coefficients from said coefficient storage means, said method comprising the steps of:

(a) producing a device which includes the above-recited elements, but in which said coefficients are not stored in said storage means; and (b) writing said coefficients in said coefficient storage taking into consideration the characteristics of the device with which the color conversion device is to be used.

BRIEF DESCRIPTION OF THE DRAWINGS

In the accompanying drawings:

FIG. 10A and FIG. 10B are tables showing the relationship between respective hues or inter-hue areas, and effective calculation terms or data which relate to and are effective for each hue or inter-hue area;

DETAILED DESCRIPTION OF THE PREFERRED EMBODIMENTS

Next, the preferred embodiments of the present invention will be described in detail with reference to the accompanying drawings.

Embodiment 1

Figure 1:
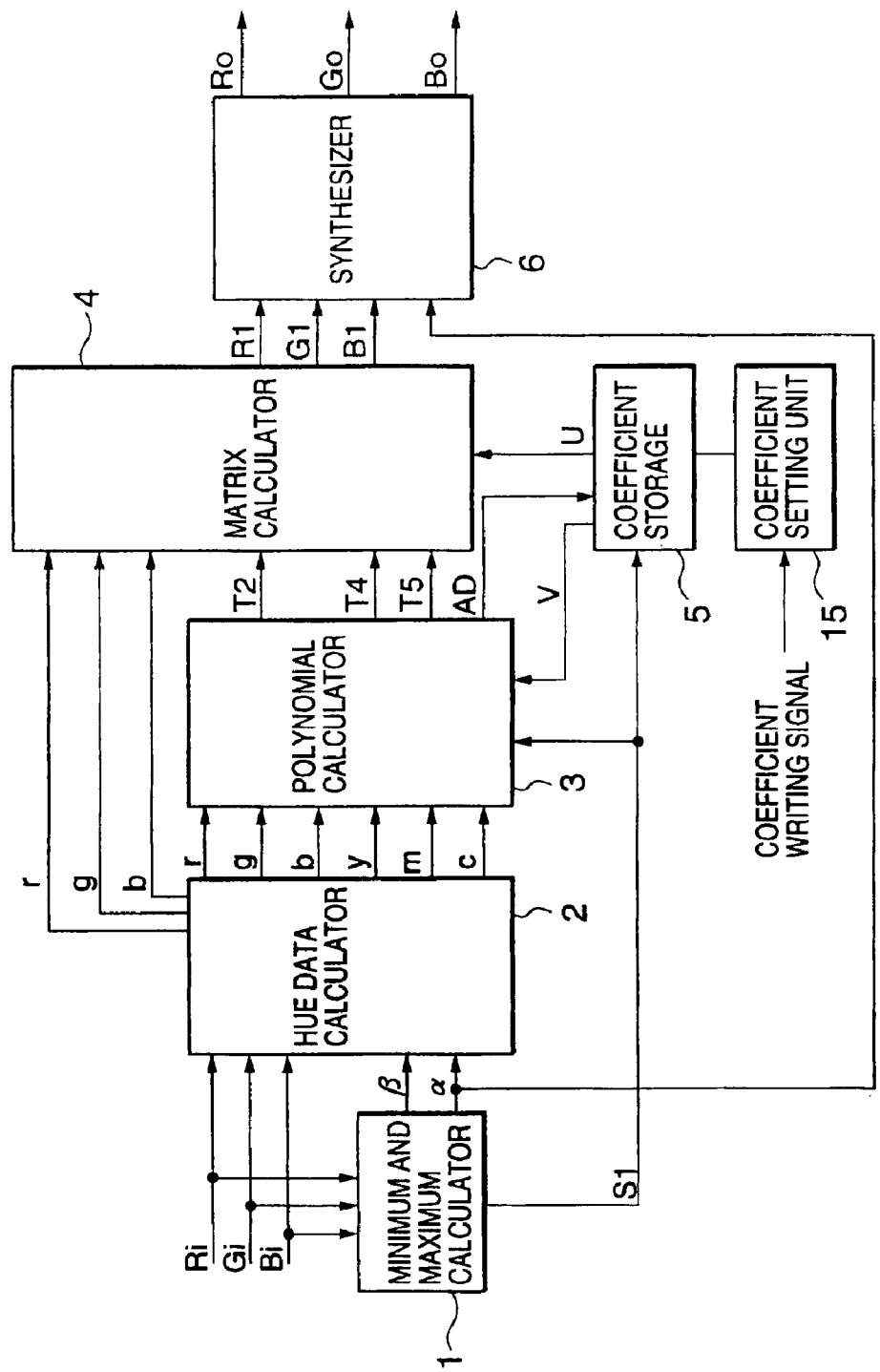
FIG. 1 is a block diagram showing an example of configuration of a color conversion device of Embodiment 1 of the present invention.

FIG. 1 is a block diagram showing an example of configuration of a color conversion device of Embodiment 1 of the present invention. The illustrated color conversion device is for converting a first set of three color data representing red, green and blue, denoted by Ri, Gi and Bi, into a second set of three color data, also representing red, green and blue, denoted by Ro, Go and Bo. A minimum and maximum calculator 1 calculates a maximum value $\beta$ and a minimum value $\alpha$ of the inputted image data denoted by Ri, Gi and Bi, and generates and outputs an identification code S1 for indicating, among the six hue data, data which are zero, as will be better understood from the following description. A hue data calculator 2 calculates hue data r, g, b, y, m and c from the image data Ri, Gi and Bi and the outputs from the minimum and maximum calculator 1. The color conversion device further comprises a polynomial calculator 3, a matrix calculator 4, a coefficient storage 5, a synthesizer 6, and a coefficient setting unit 15, which will be described later.

The coefficient setting unit 15 is manipulated by a human operator to freely set the coefficients. It may comprise a combination of a keyboard, a display unit, and a control unit for controlling the display unit, and receiving and processing commands and/or data input by the use of the keyboard.

Figures 2, 3:
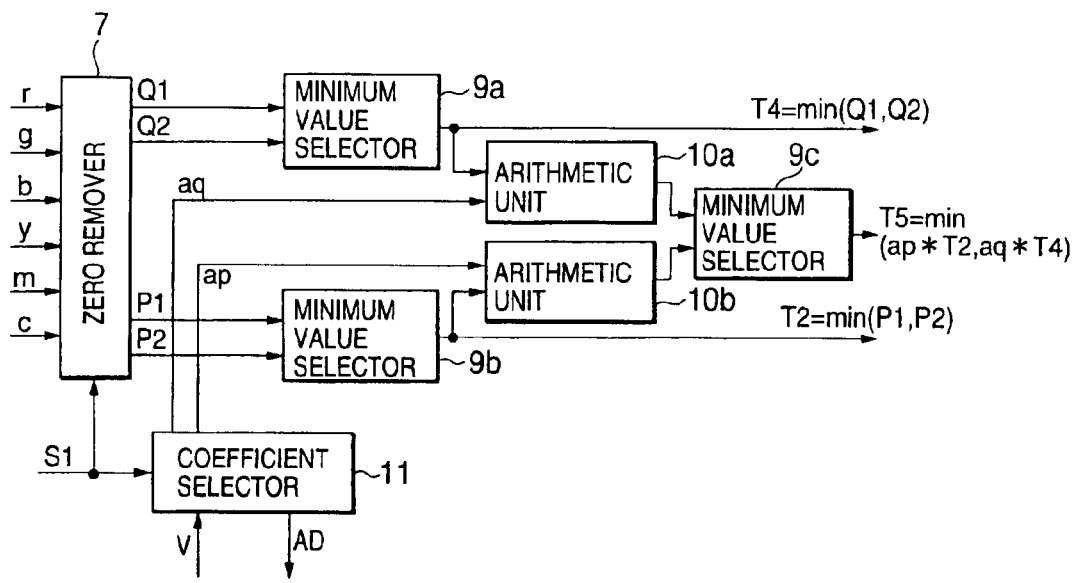
FIG. 2 is a block diagram showing an example of configuration of a polynomial calculator included in the color conversion device of Embodiment 1.
FIG. 3 is a table showing an example of the relationship between an identification code S1, and the maximum and minimum values $\beta$ and $\alpha$, and hue data whose value is zero, in the color conversion device of Embodiment 1.

FIG. 2 is a block diagram showing an example of configuration of the polynomial calculator 3. In FIG. 2, a zero remover 7 removes, from the inputted hue data, data which are of value zero. Minimum selectors 9a, 9b and 9c select and output the minimum of the input data. A calculation coefficient selector 11 selects from among the coefficients stored in the coefficient storage 5, and outputs the selected coefficients as calculation coefficients based on the identification code S1 from the minimum and maximum calculator 1. The selector may comprise a memory controller, which may be a CPU operating under a control program stored in a program memory, not shown as such. The selector 11 supplies an address signal AD to the coefficient storage 5 to read the data representing the coefficients stored at the memory location designated by the address.

Arithmetic units 10a and 10b perform multiplication between the calculation coefficients represented by the outputs of the calculation coefficient selector 11 and the outputs from the minimum selectors 9a and 9b.

Next, the operation will be described. The inputted image data Ri, Gi and Bi corresponding to the three colors of red, green and blue are sent to the minimum and maximum calculator 1 and the hue data calculator 2. The minimum and maximum calculator 1 calculates and outputs a maximum value $\beta$ and a minimum value $\alpha$ of the inputted image data Ri, Gi and Bi, and also generates and outputs an identification code S1 for indicating, among the six hue data, data data which are zero.

The hue data calculator 2 receives the inputted image data Ri, Gi and Bi and the maximum and minimum values $\beta$ and $\alpha$ from the minimum and maximum calculator 1, performs subtraction of $r=Ri-\alpha$, $g=Gi-\alpha$, $b=Bi-\alpha$, $y=\beta-Bi$, $m=\beta-Gi$, and $c=\beta-Ri$, and outputs six hue data r, g, b, y, m and c thus obtained.

The maximum and minimum values $\beta$ and $\alpha$ calculated by the minimum and maximum calculator 1 are respectively represented as follows:

$\beta=\text{MAX}(Ri,Gi,Bi)$ $\alpha=\text{MIN}(Ri,Gi,Bi)$

Since the six hue data r, g, b, y, m and c calculated by the hue data calculator 2 are obtained by the subtraction of $r=Ri-\alpha$, $g=Gi-\alpha$, $b=Bi-\alpha$, $y=\beta-Bi$, $m=\beta-Gi$, and $c=\beta-Ri$, at least two among these six hue data are of a value zero. For example, if a maximum value $\beta$ is Ri and a minimum value $\alpha$ is Gi ($\beta$=Ri, and $\alpha$=Gi), g=0 and c=0. If a maximum value $\beta$ is Ri and a minimum value $\alpha$ is Bi ($\beta$=Ri, and $\alpha$=Bi), b=0 and c=0. In other words, in accordance with a combination of Ri, Gi and Bi which are the largest and the smallest, respectively, one of r, g and b, and one of y, m and c, i.e., in total two of them have a value zero.

Thus, in the foregoing minimum and maximum calculator 1, the identification code S1 for indicating, among the six hue data which are zero are generated and outputted. The identification code S1 can assume one of the six values, depending on which of Ri, Gi and Bi are of the maximum and minimum values $\beta$ and $\alpha$. FIG. 3 shows a relationship between the values of the identification code S1 and the maximum and minimum values $\beta$ and $\alpha$ of Ri, Gi and Bi and hue data which has a value zero. In the drawing, the values of the identification code S1 represent just an example, and the values may be other than those shown in the drawing.

Then, the six hue data r, g, b, y, m and c outputted from the hue data calculator 2 are sent to the polynomial calculator 3, and the hue data r, g and b are also sent to the matrix calculator 4. The polynomial calculator 3 also receives the identification code S1 outputted from the minimum and maximum calculator 1, and performs calculation by selecting, from the hue data r, g and b, two data Q1 and Q2 which are not of a value zero, and from the hue data y, m and c, two data P1 and P2 which are not of a value zero. Next, this operation will be described by referring to FIG. 2.

Figures 4, 5:
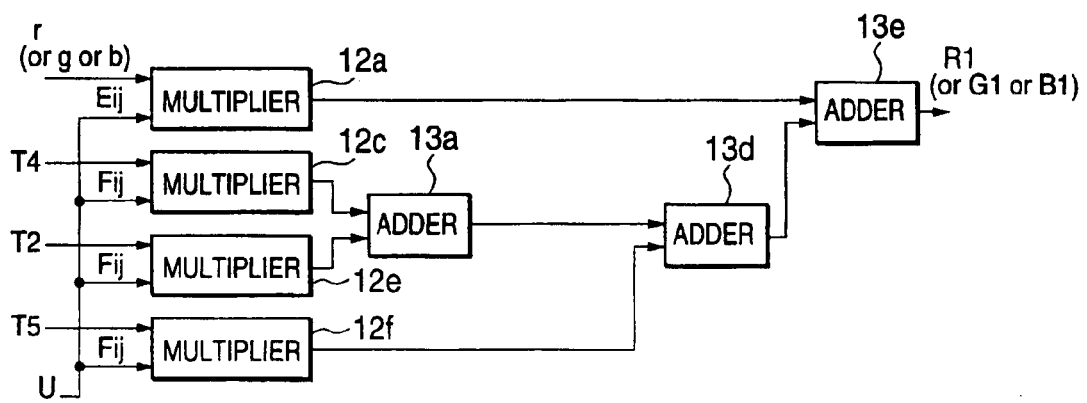
FIG. 4 is a table showing the operation of a zero remover of the polynomial calculator in the color conversion device of Embodiment 1.
FIG. 5 is a block diagram showing an example of configuration of a matrix calculator included in the color conversion device of Embodiment 1.

The hue data from the hue data calculator 2 and the identification code S1 from the minimum and maximum calculator 1 are inputted to the zero remover 7 in the polynomial calculator 3. The zero remover 7 outputs, based on the identification code S1, the two data Q1 and Q2 which are not of a value zero, among the hue data r, g and b and the two data P1 and P2 which are not of a value zero, among the hue data y, m and c. For instance, Q1, Q2, P1 and P2 are determined as shown in FIG. 4, and then outputted. If, for example, the identification code S1 is of a value zero, Q1 and Q2 are obtained from the hue data r and b, and P1 and P2 are obtained from the hue data y and m, so the outputs are given by Q1=r, Q2=b, P1=m and P2=y. As in the case of FIG. 3, the values of the identification code S1 in FIG. 4 represent just an example, and may be other than those shown in FIG. 4.

The minimum selector 9a selects and outputs the minimum value T4=min (Q1, Q2) among the output data Q1 and Q2 from the zero remover 7. The minimum selector 9b selects and outputs the minimum value T2=min (P1, P2) among the output data P1 and P2 from the zero remover 7. The outputs of the minimum selectors 9a and 9b are the first comparison-result data.

The identification code S1 is inputted from the minimum and maximum calculator 1 to the calculation coefficient selector 11, which selects signals indicating calculation coefficients aq and ap from among the signals stored in the coefficient storage 5, the selection being made based on the identification code S1, and the coefficient aq is supplied to the arithmetic unit 10a, and the coefficient ap is supplied to the arithmetic unit 10b. These calculation coefficients aq and ap are used for multiplication with the comparison-result data T4 and T2, and each of the calculation coefficients aq and ap can assume one of the six values, corresponding to the value of the identification code S1 shown in FIG. 4. The arithmetic unit 10a receives the comparison-result data T4 from the minimum selector 9a, performs multiplication of aq*T4, and sends the result to the minimum selector 9c. The arithmetic unit 10b receives the comparison-result data T2 from the minimum selector 7, performs multiplication of ap*T2, and sends the result to the minimum selector 9c.

The minimum selector 9c selects and outputs the minimum value T5=min (aq*T2, ap*T4) of the outputs the arithmetic units 10a and 10b. The output of the minimum value selector 9c is a second comparison-result data.

The polynomial data T2, T4 and T5 outputted from the polynomial calculator 3 are supplied to the matrix calculator 4.

The calculation coefficients U (Fij) and fixed coefficients U (Eij) for the polynomial data are read or outputted from the coefficient storage 5 shown in FIG. 1 based on the identification code S1, and sent to the matrix calculator 4.

The matrix calculator 4 receives the hue data r, g and b from the hue data calculator 2, the polynomial data T2, T4 and T5 from the polynomial calculator 3 and the coefficients U from the coefficient storage 5, and outputs the results of calculation according to the following formula (6) as image data R1, G1 and B1.

$$\begin{bmatrix} R1 \\ G1 \\ B1 \end{bmatrix} = (Eij) \begin{bmatrix} r \\ g \\ b \end{bmatrix} + (Fij) \begin{bmatrix} T2 \\ T4 \\ T5 \end{bmatrix} \quad (6)$$

For (Eij), i=1 to 3 and j=1 to 3, and for (Fij), i=1 to 3 and j=1 to 3.

FIG. 5, which is a block diagram, shows an example of configuration of part of the matrix calculator 4. Specifically, it shows how R1 is calculated and outputted. As shown in FIG. 5, the matrix calculator 4 includes multipliers 12a, 12c, 12e and 12f, and adders 13a, 13d and 13e interconnected as illustrated.

Next, the operation of the matrix calculator 4 of FIG. 5 will be described. The multipliers 12a, 12c, 12e and 12f receive the hue data r, the polynomial data T2, T4 and T5 from the polynomial calculator 3 and the coefficients U (Eij) and U (Fij) from the coefficient storage 5, and then output the products thereof. The adder 13a receives the products outputted from the multipliers 12c and 12e, adds the inputted data and outputs the sum thereof. The adder 13d adds the output from the adder 13a and the product outputted from the multiplier 12f. The adder 13e adds the output from the adder 13d and the outputted from the multiplier 12a, and outputs the sum total thereof as image data R1. In the example of configuration shown in FIG. 5, if the hue data r is replaced by the hue data g or b, and coefficients suitable for the respective terms (data) T2, T4 and T5 are used in substitution, image data G1 or B1 can be calculated.

Where it is desired to increase the calculation speed of the color conversion method or the color conversion device of this embodiment, since parts of the coefficients (Eij) and (Fij) which respectively correspond to the hue data r, g and b are used, the configurations each as shown in FIG. 5 may be used in parallel, so as to perform the matrix calculation at a higher speed.

The synthesizer 6 receives the image data R1, G1 and B1 from the matrix calculator 4 and the minimum value α outputted from the minimum and maximum calculator 1 representing the achromatic data, performs addition, and outputs image data Ro, Go and Bo. The equation used for obtaining the image data color-converted by the color-conversion method of FIG. 1 is therefore given by the following formula (1).

$$\begin{bmatrix} Ro \\ Go \\ Bo \end{bmatrix} = (Eji) \begin{bmatrix} r \\ g \\ b \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \end{bmatrix} + \begin{bmatrix} \alpha \\ \alpha \\ \alpha \end{bmatrix} \quad (1)$$

Here, for (Eij), i=1 to 3 and j=1 to 3, and for (Fij), i=1 to 3 and j=1 to 12, and $h1r=\min(m,y)$, $h1g=\min(y,c)$, $h1b=\min(c,m)$, $h1c=\min(g,b)$, $h1m=\min(b,r)$, $h1y=\min(r,g)$, $h2ry=\min(aq1*h1y,ap1*h1r)$, $h2rm=\min(aq2*h1m,ap2*h1r)$, $h2gy=\min(aq3*h1y,ap3*h1g)$, $h2gc=\min(aq4*h1c,ap4*h1g)$, $h2bm=\min(aq5*h1m,ap5*h1b)$, and $h2bc=\min(aq6*h1c,ap6*h1b)$, and aq1 to aq6 and ap1 to ap6 indicate calculation coefficients selected by the calculation coefficient selector 11 of FIG. 2.

The difference between the number of calculation terms in the formula (1) and the number of calculation terms in FIG. 1 is that FIG. 1 shows a method of calculation for each pixel excluding the calculation terms which are of a value zero, while the formula (1) represents a general formula for a set of pixels. In other words, twelve polynomial data for one pixel of the formula (1) can be reduced to three effective data, and this reduction is achieved by exploiting a characteristic of the hue data.

The combination of effective data is changed according to image data of the target pixel. For all image data, all the polynomial data can be effective.

Figure 6A:
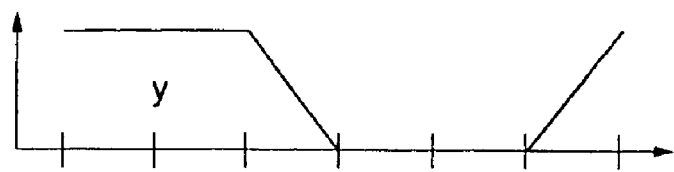
FIG. 6A to FIG. 6F are diagrams schematically showing the relationship between six six hues and hue data.
Figure 6B:
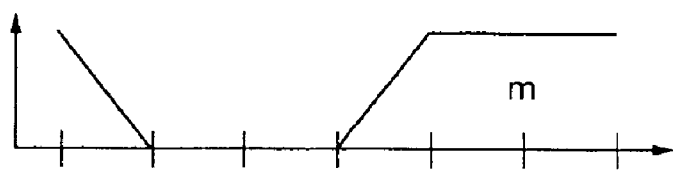
Figure 6C:
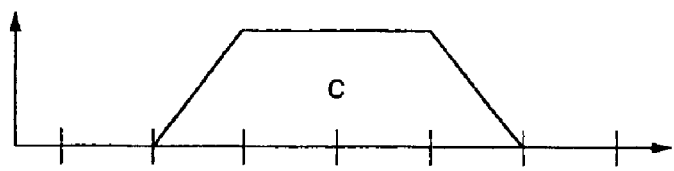
Figure 6D:
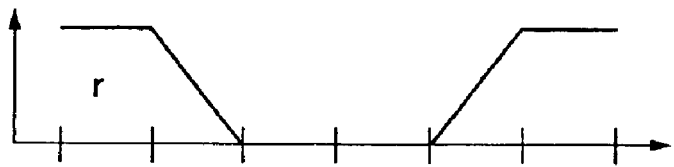
Figure 6E:
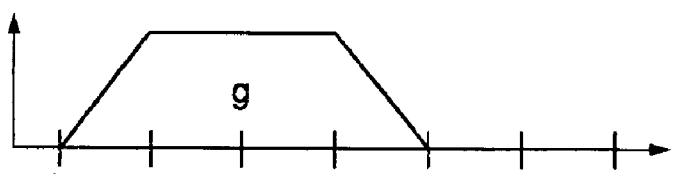
Figure 6F:
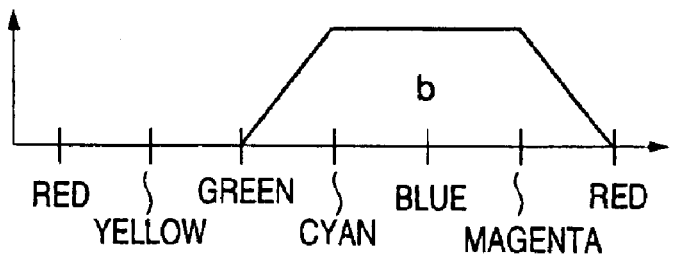
Figure 7A:
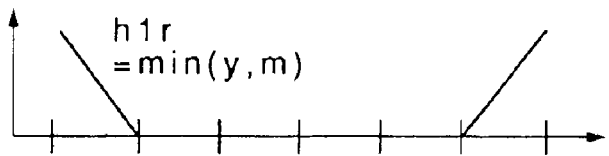
FIG. 7A to FIG. 7F are diagrams schematically showing the relationship between six hues and first comparison-result data in the color conversion device of Embodiment 1.
Figure 7B:
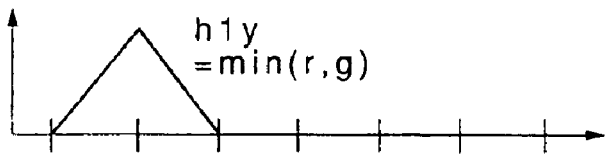
Figure 7C:
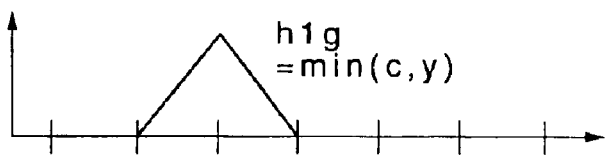
Figure 7D:
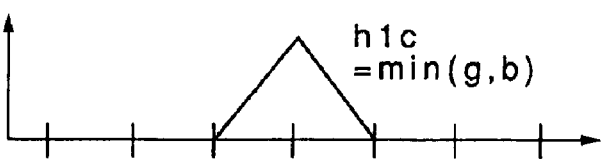
Figure 7E:
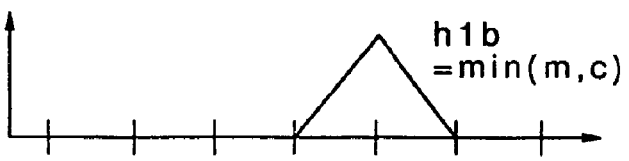
Figure 7F:
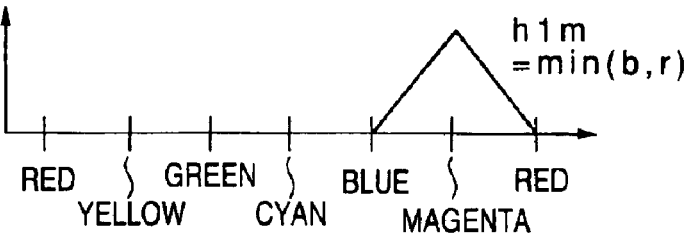
Figure 8A:
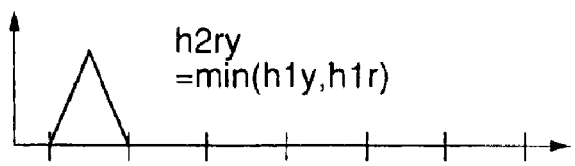
FIG. 8A to FIG. 8F are diagrams schematically showing the relationship between six inter-hue areas and second comparison-result data in the color conversion device of Embodiment 1.
Figure 8B:
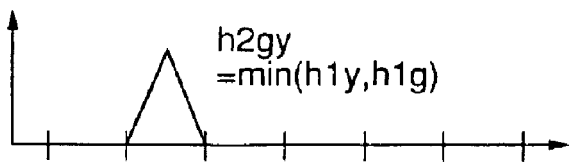
Figure 8C:
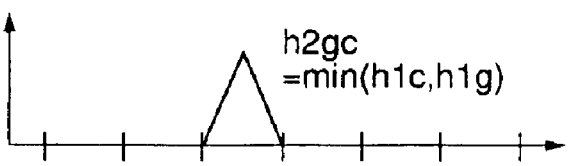
Figure 8D:
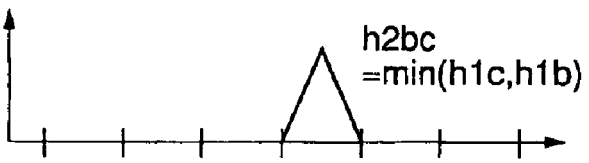
Figure 8E:
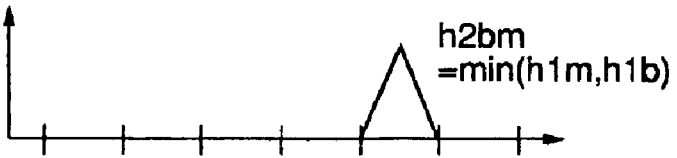
Figure 8F:
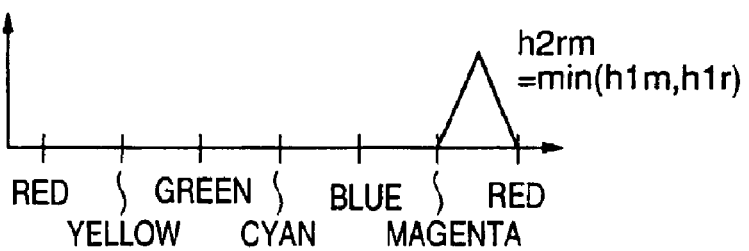
Figure 9A:
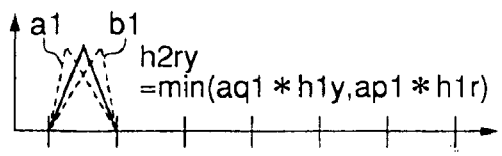
FIG. 9A to FIG. 9F are diagrams schematically showing how the range of each inter-hue area is changed with the change of the coefficients multiplied at the polynomial calculator is changed.
Figure 9B:
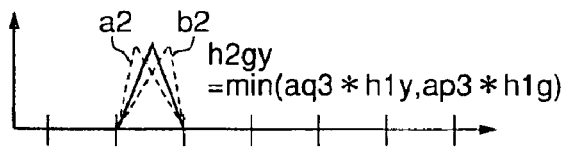
Figure 9C:
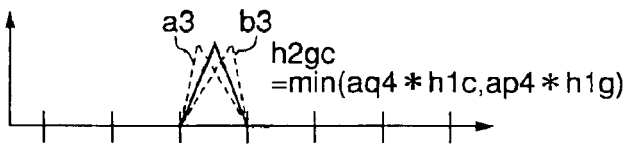
Figure 9D:
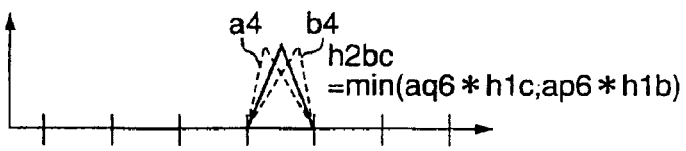
Figure 9E:
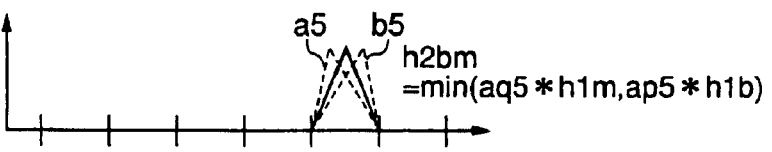
Figure 9F:
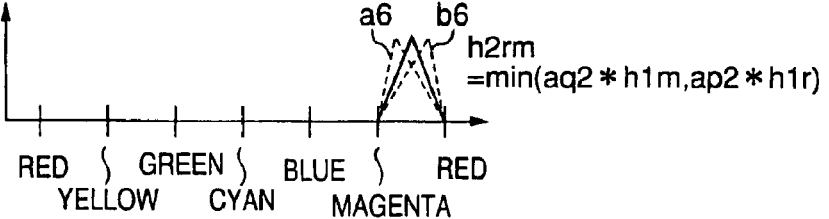

FIG. 6A to FIG. 6F schematically show relations between the six hues (red, yellow, green, cyan, blue, magenta) and the hue data y, m, c, r, g and b. Each hue data relates to, i.e., extends to cover the range of three hues. For example, y as shown in FIG. 6A relates to, or extends to cover three hues of red, yellow and green.

Each of the foregoing formulae (6) and (1) includes a first comparison-result data effective only for one hue. The first comparison-result data are:

$h1r=\min(y,m)$, $h1y=\min(r,g)$ $h1g=\min(c,y)$, $h1c=\min(g,b)$, $h1b=\min(m,c)$, and $h1m=\min(b,r)$.

FIG. 7A to FIG. 7F schematically show relations between the six hues and first comparison-result data h1r, h1y, h1g, h1c, h1b, and h1m. It is seen that each of the first comparison-result data relates to only one specific hue.

For instance, if W is a constant, for red, r=W, g=b=0, so that y=m=W, and c=0. The other five first comparison-result data are all of a value zero. That is, for red, h1r=min (y, m) alone is the only effective first comparison-result data. Similarly, h1g=min (c, y) is the only effective first comparison-result data for green; h1b=min (m, c) for blue; h1c=min (g, b) for cyan; h1m=min (b, r) for magenta; and h1y=min (r, g) for yellow.

FIG. 8A to FIG. 8F schematically show relations between the six hues and second comparison-result data:

$h2ry=\min(h1y,h1r)$, $h2gy=\min(h1y,h1g)$, $h2gc=\min(h1c,h1g)$, $h2bc=\min(h1c,h1b)$, $h2bm=\min(h1m,h1b)$, and $h2rm=\min(h1m,h1r)$.

This is the case in which the coefficients aq1 to aq6 and ap1 to ap6 in $h2ry=\min(aq1*h1y,ap1*h1r)$, $h2rm=\min(aq2*h1m,ap2*h1r)$, $h2gy=\min(aq3*h1y,ap3*h1g)$, $h2gc=\min(aq4*h1c,ap4*h1g)$, $h2bm=\min(aq5*h1m,ap5*h1b)$, and $h2bc=\min(aq6*h1c,ap6*h1b)$, in the formula (1) above are all of a value "1".

It can be understood from FIG. 8A to FIG. 8F, that each of the second comparison-result data relates to changes in the six inter-hue areas of red-green, yellow-green, green-cyan, cyan-blue blue-magenta, and magenta-red. In other words, for red-yellow, b=c=0, and the five terms other than h2ry=min (h1y, h1r)=min (min (r, g), min (y, m)) are all zero. Accordingly, only h2ry is an effective second comparison-result data for red-yellow. Similarly, only h2gy is an effective second comparison-result data for yellow-green; h2gc for green-cyan: h2bc for cyan-blue; h2bm for blue-magenta; and h2rm for magenta-red.

Moreover, the range of the inter-hue area to which each of the second comparison-result data relates is half that of the range of the hue to which each of the first comparison-result data relates.

FIG. 9A to FIG. 9F schematically show how the range of the six inter-hue area to which each of the second comparison-result data relate is changed when the coefficients aq1 to aq6 and ap1 to ap6 used for determination of h2ry, h2rm, h2gy, h2gc, h2bm and h2bc according to the foregoing formulae (6) and (1) are changed.

The broken lines a1 to a6 shows the characteristics when aq1 to aq6 assume values larger than ap1 to ap6. The broken lines b1 to b6 shows the characteristics when ap1 to ap6 assume values larger than aq1 to aq6.

Specifically, for inter-hue area red-yellow, only h2ry=min (aq1*h1y, ap1*h1r) is an effective second comparison-result data. If, for example, the ratio between aq1 and ap1 is 2:1, the peak value of the second comparison-result data is shifted toward red, as indicated by the broken line a1 in FIG. 9A, and thus it can be made an effective comparison-result data for an area closer to red in the inter-hue area of red-yellow. On the other hand, for example if the ratio between aq1 and ap1 is 1:2, the relationship is like that indicated by the broken line b1 in FIG. 9A, the peak value of the second comparison-result data is shifted toward yellow, and thus it can be made an effective comparison-result data for an area closer to yellow in the inter-hue area of red-yellow. Similarly, by respectively changing:

aq3 and ap3 in h2gy for yellow-green, aq4 and ap4 in h2gc for green-cyan, aq6 and ap6 in h2bc for cyan-blue, aq5 and ap5 in h2bm for blue-magenta and aq2 and ap2 in h2rm for magenta-red, in the area for which each second comparison-result data is most effective can be changed.

FIG. 10A and FIG. 10B respectively show relations between the six hues and inter-hue areas and effective calculation terms. Thus, if the coefficients which are stored in the coefficient storage 5 and which are for a calculation term effective for a hue or an inter-hue area to be adjusted are changed, only the target hue or inter-hue area can be adjusted. Further, if coefficients selected by the calculation coefficient selector 11 in the polynomial calculator 3 are changed, part of the inter-hue area where a calculation term in the inter-hue area is most effective can be changed without giving any influence to the other hues.

Next, an example of coefficients outputted from the coefficient storage 5 of Embodiment 1 described above with reference to FIG. 1 will be described. The following formula (5) shows an example of coefficients U (Eij) outputted from the coefficient storage 5.

$$(Eij) = \begin{bmatrix} 1 & 0 & 0 \\ 0 & 1 & 0 \\ 0 & 0 & 1 \end{bmatrix} \quad (5)$$

If the coefficients U (Fij) in the foregoing formula are all zero this represents the case where color conversion is not executed. The following formula (7) shows the case where, of the coefficients U (Fij), coefficients for first comparison-result data and second comparison-result data are represented by, for example Ar1 to Ar3, Ay1 to Ay3, Ag1 to Ag3, Ac1 to Ac3, Ab1 to Ab3, Am1 to Am3, Ary1 to Ary3, Agy1 to Agy3, Agc1 to Agc3, Abc1 to Abc3, Abm1 to Abm3 and Arm1 to Arm3.

$$(Fij) = \begin{bmatrix} Ar1 & Ag1 & Ab1 & Ac1 & Am1 & Ay1 & Ary1 & Arm1 & Agy1 & Agc1 & Abm1 & Abc1 \\ Ar2 & Ag2 & Ab2 & Ac2 & Am2 & Ay2 & Ary2 & Arm2 & Agy2 & Agc2 & Abm2 & Abc2 \\ Ar3 & Ag3 & Ab3 & Ac3 & Am3 & Ay3 & Ary3 & Arm3 & Agy3 & Agc3 & Abm3 & Abc3 \end{bmatrix} \quad (7)$$

In the foregoing, adjustment is performed by using the first comparison-result data and second comparison-result data. Accordingly, only a hue or an inter-hue area can be linearly adjusted. If coefficients relating to a first-order calculation term for a hue or an inter-hue area to be adjusted are set to values other than zero, and the other coefficients are made to be zero, only the target hue or inter-hue area can be adjusted. For example, if coefficients Ar1 to Ar3 relating to h1r relating to red are set, the red hue is changed, and to vary the proportion between red and yellow, the coefficients Ary1 to Ary3 relating to h2ry are used.

Furthermore, if, in the polynomial calculator 3, the values of calculation coefficients aq1 to aq6 and ap1 to ap6 in $h2ry=\min(aq1*h1y,ap1*h1r)$, $h2rm=\min(aq2*h1m,ap2*r)$, $h2gy=\min(aq3*h1y,ap3*h1g)$, $h2gc=\min(aq4*h1c,ap4*h1g)$, $h2bm=\min(aq5*h1m,ap5*h1b)$, and $h2bc=\min(aq6*h1c,ap6*h1b)$ are changed so as to assume integral values of 1, 2, 4, 8, . . . , i.e., $2^n$ (where n is an integer), multiplication can be achieved in the arithmetic units 10a and 10b by bit shifting.

As apparent from the foregoing, by changing the coefficients for the first comparison-result data relating to specific hues, it is possible to adjust only the target hue among the six hues of red, blue, green, yellow, cyan and magenta, and by changing the coefficients for the second comparison-result data, it is possible to vary the colors in the six inter-hue areas of red-yellow, yellow-green, green-cyan, cyan-blue, blue-magenta, and magenta-red. The adjustment of each hue or inter-hue area can be achieved independently, i.e., without influencing other hues or other inter-hue areas.

Accordingly, it is possible to obtain color conversion methods or color conversion devices which can change the conversion characteristics flexibly, without requiring a large-capacity memory.

Figure 11:
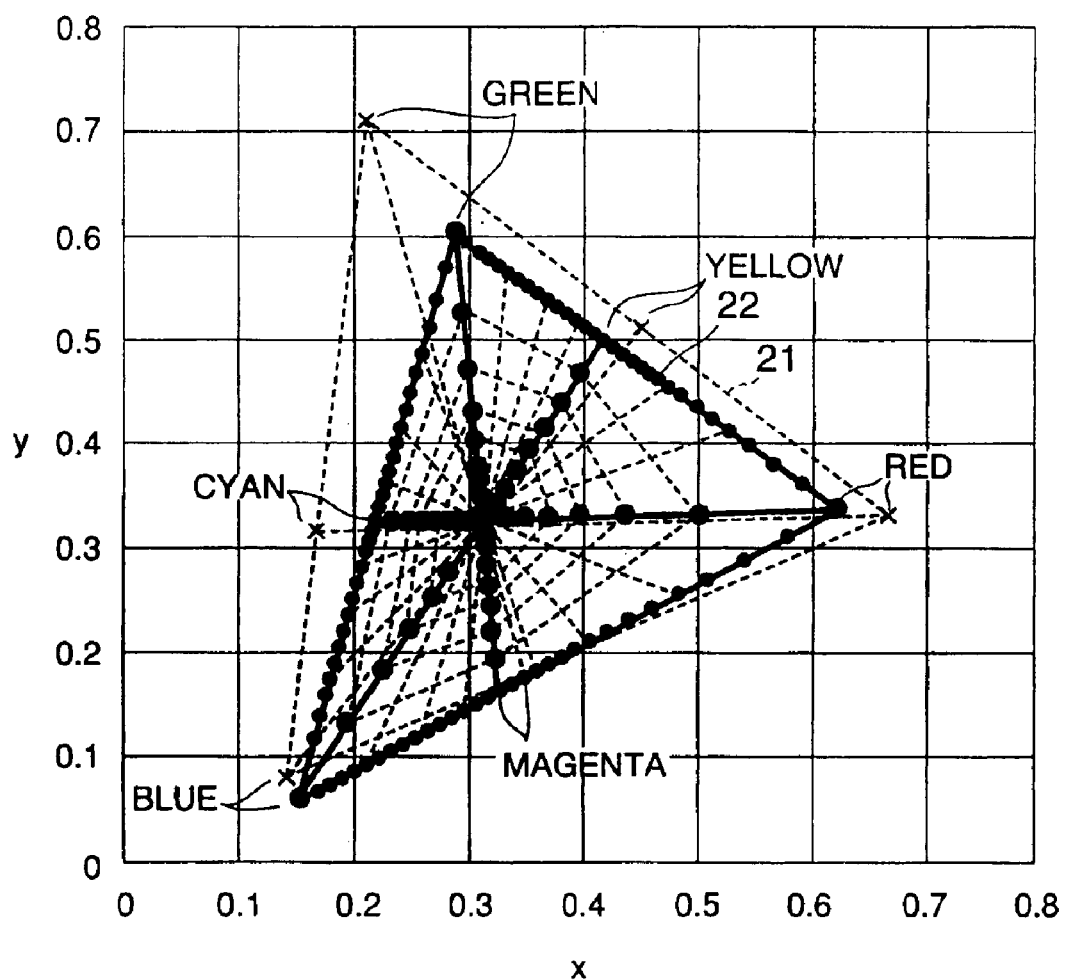
FIG. 11 is an xy chromaticity diagram illustrating the gamut of the color reproduction of the input color signals and the gamut of a desired color reproduction, for explaining the operation of Embodiment 1.
Figure 12:
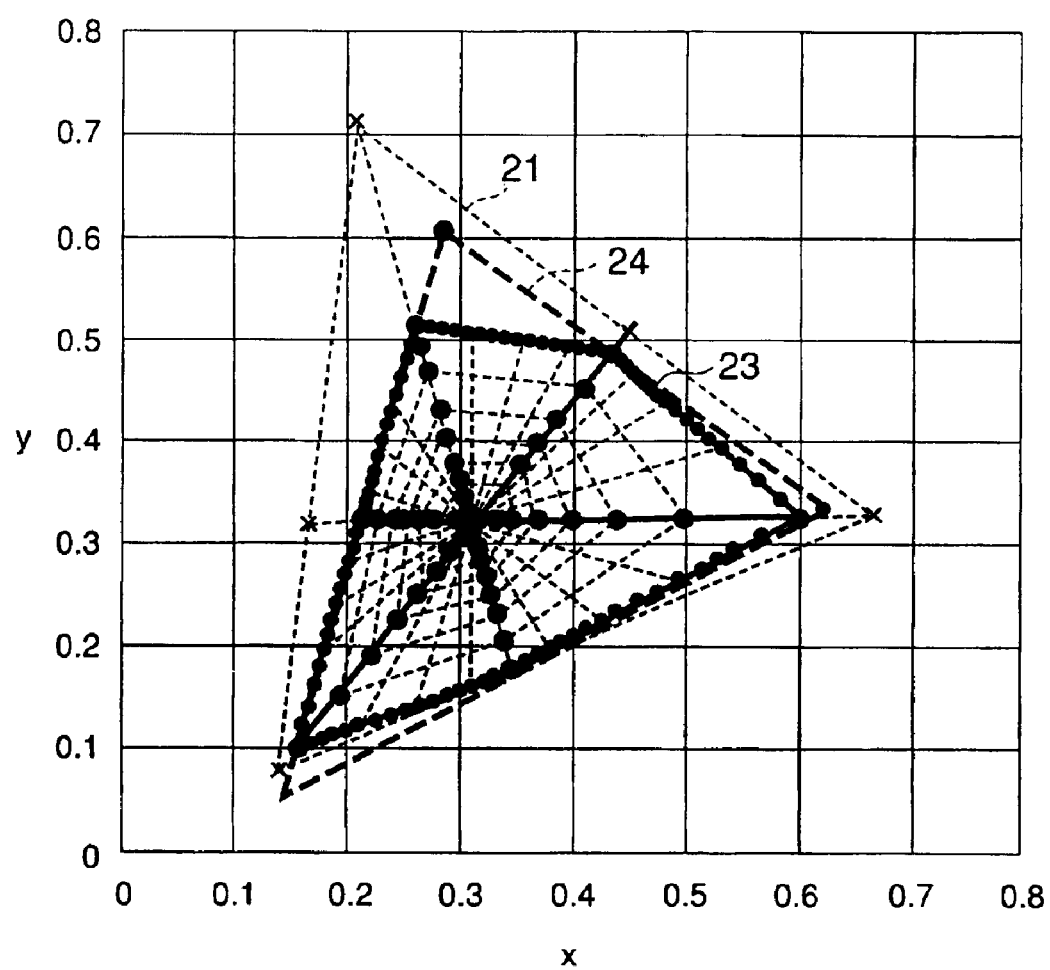
FIG. 12 is an xy chromaticity diagram illustrating the gamut of the color reproduction obtained by adjusting the coefficients for the first comparison-result data, together with the gamut of the desired color reproduction, for explaining the operation of Embodiment 1.
Figure 13:
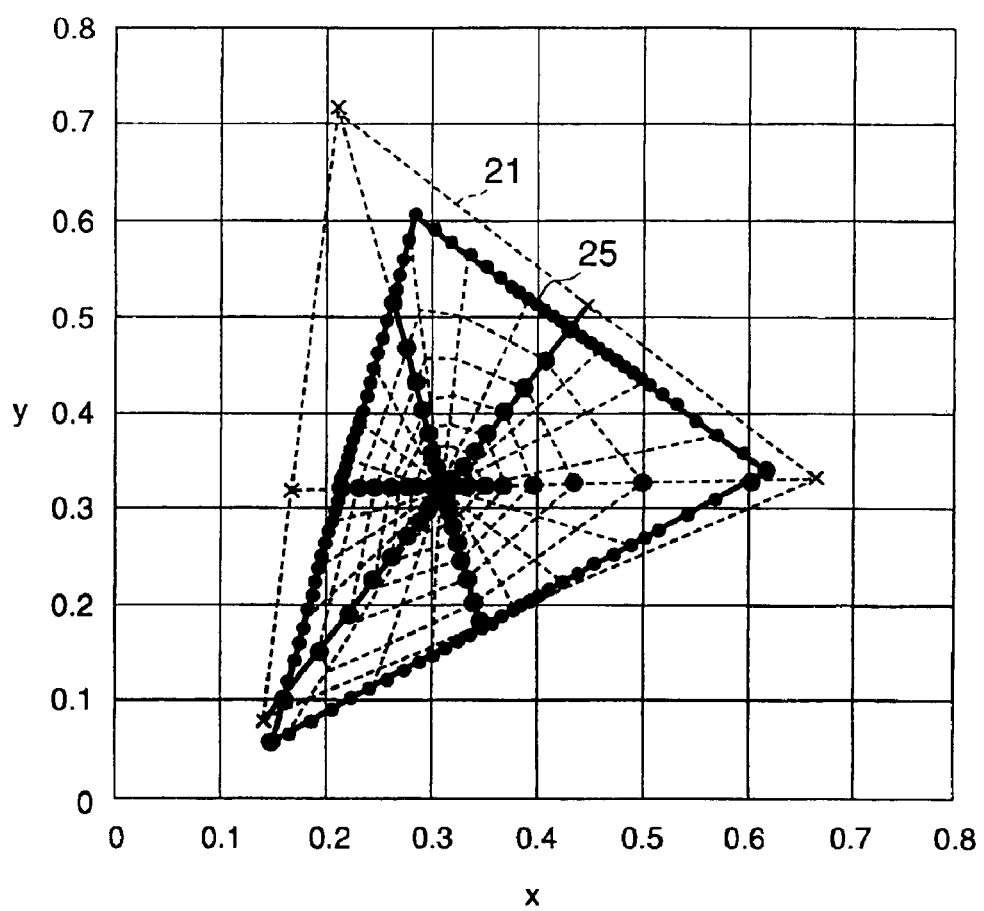
FIG. 13 is an xy chromaticity diagram for explaining the gamut of the color reproduction obtained by adjusting the coefficients for the first and second comparison-result data, together with the gamut of the desired color reproduction, for explaining the operation of Embodiment 1.

Further description on the operation of the color conversion device using the coefficients represented by the formulae (5) and (7) will be given. FIG. 11 to FIG. 13 show an xy chromaticity diagram showing the operation of the color conversion device of Embodiment 1. In FIG. 11 to FIG. 13, the dotted line 21 represents the gamut of the desired color reproduction. In FIG. 11, the triangle of the solid line 22 represents the gamut of color reproduction (reproducible colors) of the input color signals Ri, Gi and Bi. Here, the input color signals may be those for a certain type of image reproducing device, such as a display device, e.g., a CRT monitor. The "desired color reproduction" may be the color reproduction by another type of display device, or theoretical or imaginary color reproduction.

The directions of lines extending from the center of each triangle to the vertexes and points on the sides of the triangle represent respective hues.

In the example of FIG. 11, there are differences between the color reproduction of the input color signals and the desired color reproduction with regard to the directions of the lines extending from the center of the triangle to the vertexes and points on the sides. This means that the hues of the reproduced colors are different.

The color conversion device of Embodiment 1 of the invention uses the first comparison-result data effective for each of the six hues, and the second comparison-result data effective for each of the inter-hue areas.

In FIG. 12, the solid line 23 represents the gamut of the color reproduction after the adjustment of the coefficients for the first comparison-result data, while the broken line 24 represents the gamut of the color reproduction without the adjustment of the coefficients. As will be seen, the hues of the color reproduction as represented by the solid line 23 and the hues of the desired color reproduction as represented by the dotted line 21 coincide with each other. The coincidence is achieved by adjusting the coefficients for the first comparison-result data. However, it is noted that the gamut of the color reproduction as represented by the solid line 23 is narrower than the gamut of the color reproduction as represented by the broken line 24 (without the adjustment of the coefficients).

FIG. 13 shows the gamut 25 of the color reproduction obtained when both the coefficients for the first comparison-result data and the coefficients for the second comparison-result data are adjusted. By adjusting both the coefficients for the first and second comparison-result data, the hues of the color reproduction as represented by the line 25 coincides with the hues of the desired color reproduction, and the gamut 25 of the color reproduction obtained when both the coefficients for the first and second comparison-result data are identical to the gamut (22 in FIG. 11) of the color reproduction obtained when the coefficients for the first and second comparison-result data are not adjusted. That is, in the color conversion device according to Embodiment 1 of the invention, by adjusting the coefficients for the first and second comparison-result data, the hues can be adjusted without narrowing the gamut of the color reproduction.

In Embodiment 1 described above, the hue data r, g, b, y, m and c, and the maximum and minimum values $\beta$ and $\alpha$ were calculated based on the inputted image data Ri, Gi and Bi so as to obtain the calculation terms for the respective hues, and the image data Ro, Go, Bo are obtained after the calculation according to the formula (1). As an alternative, after the output image data Ro, Go, Bo are obtained, they may then be converted to data representing cyan, magenta and yellow, by determining 1's complement. In this case, the same effects will be realized.

Furthermore, in Embodiment 1 described above, most of the processing was performed by the hardware configuration of FIG. 1. Needless to say, the same processing can be performed by software in the color conversion device, and in this case, the same effects as those of Embodiment 1 will be provided.

According to the embodiment described above, because the coefficients can be set and/or altered by the use of the coefficient setting unit 15, it is possible to obtain color reproducibility taking into consideration the characteristics of the output device or the input device with which the color conversion device of the invention is to be used or the color conversion characteristics preferred by the user.

The coefficients can be set freely by the user, so as to alter the color reproducibility. This is a significant advantage because different users prefer different color reproducibilities. The color conversion characteristics may be changed while observing the result of the change by means of a display or a printer, until desired characteristics are obtained.

Embodiment 2

In Embodiment 1, the hue data r, g, b, y, m and c, and the maximum and minimum values $\beta$ and $\alpha$ were calculated based on the inputted image data of red, green and blue so as to obtain the calculation terms for the respective hues, and after the matrix calculation, the image data red, green and blue were obtained. But the image data of red, green and blue may first be converted into complementary color data of cyan, magenta and yellow, by determining 1's complement of the input image data, and then color conversion may be executed by inputting the complementary color data of cyan, magenta and yellow.

Figure 14:
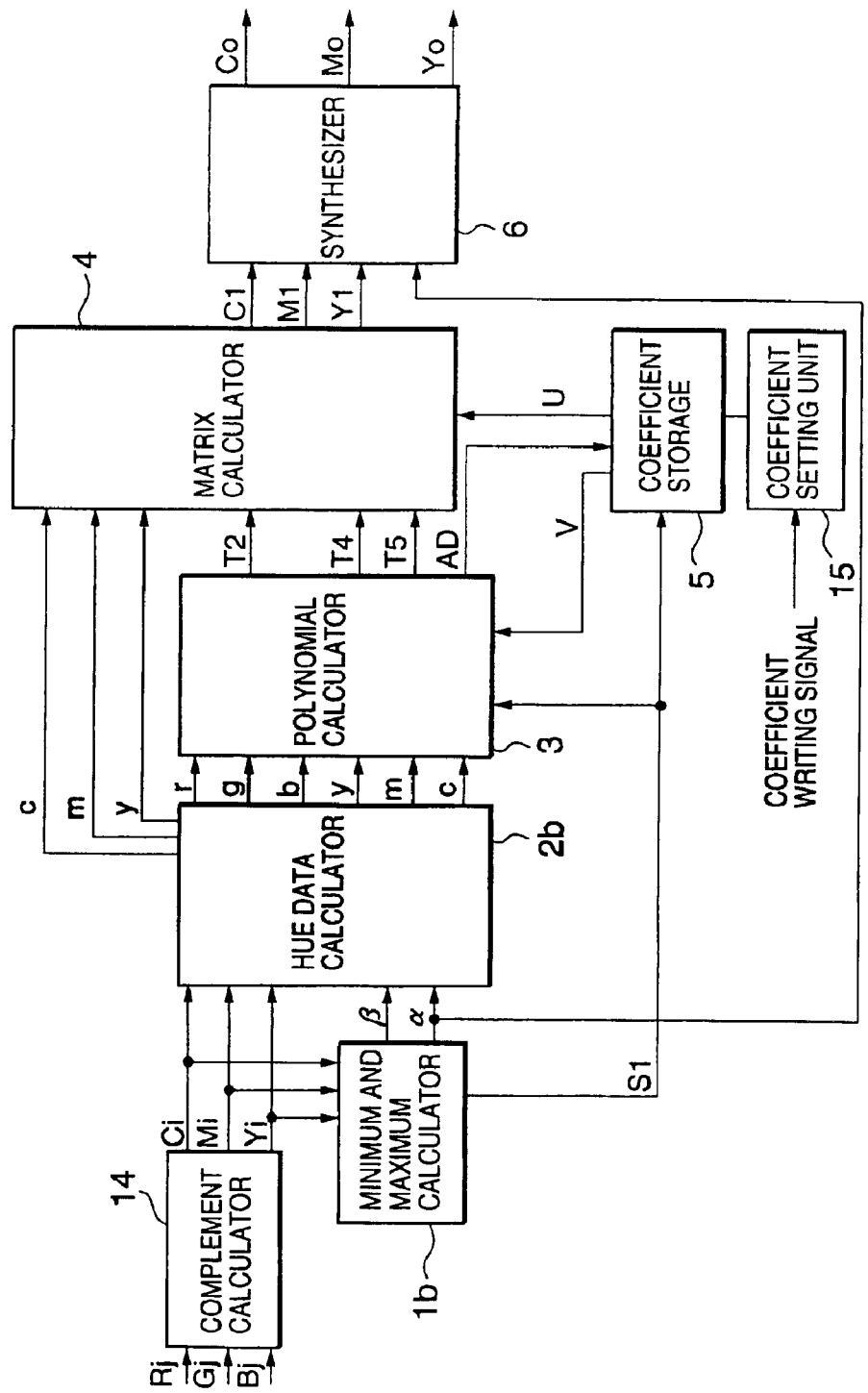
FIG. 14 is a block diagram showing an example of configuration of a color conversion device of Embodiment 2 of the present invention.

FIG. 14 is a block diagram showing an example of configuration of a color conversion device of Embodiment 2 of the present invention. In describing Embodiment 2, the inputted image data of red, green and blue are denoted by Rj, Gj and Bj. Reference numerals 3, 4, 5, 6, and 15 denote the same members as those described with reference to FIG. 1 in connection with Embodiment 1. Reference numeral 14 denotes a complement calculator; 1b, a minimum and maximum calculator for generating maximum and minimum values $\beta$ and $\alpha$ of complementary color data and an identification code for indicating, among the six hue data, data which are zero; and 2b, a hue data calculator for calculating hue data r, g, b, y, m and c based on complementary color data Ci, Mi and Yi from the complement calculator 14 and outputs from the minimum and maximum calculator 1b.

Next, the operation will be described. The complement calculator 14 receives the image data Rj, Gj and Bj, and outputs complementary color data Ci, Mi and Yi obtained by determining 1's complements. The minimum and maximum calculator 1b outputs the maximum and minimum values $\beta$ and $\alpha$ of each of these complementary color data and the identification code S1.

Then, the hue data calculator 2b receives the complementary color data Ci, Mi and Yi and the maximum and minimum values $\beta$ and $\alpha$ from the minimum and maximum calculator 1b, performs subtraction of $r=\beta-Ci$, $g=\beta-Mi$, $b=\beta-Yi$, $y=Yi-\alpha$, $m=Mi-\alpha$, and $c=Ci-\alpha$, and outputs six hue data r, g, b, y, m and c. Here, at least two among these six hue data are zero. The identification code S1 outputted from the minimum and maximum calculator 1b is used for specifying, among the six hue data, data which is zero. The value of the identification code S1 depends on which of Ci, Mi and Yi the maximum and minimum values $\beta$ and $\alpha$ are. Relations between the data among the six hue data which are zero, and the values of the identification code S1 are the same as those in Embodiment 1, and thus further explanation will be omitted.

Then, the six hue data r, g, b, y, m and c outputted from the hue data calculator 2b are sent to the polynomial calculator 3, and the hue data c, m and y are also sent to the matrix calculator 4. The polynomial calculator 3 also receives the identification code S1 outputted from the minimum and maximum calculator 1b, and performs calculation by selecting, from the hue data, two data Q1 and Q2 which are not zero, and from the hue data y, m and c, two data P1 and P2 which are not of a value zero. This operation is identical to that described with reference to FIG. 2 in connection with Embodiment 1, so that detailed description thereof. Is omitted.

The output of the polynomial calculator 3 is supplied to the matrix calculator 4, and the calculation coefficients U (Fij) and fixed coefficients U (Eij) for the polynomial data are read or outputted from the coefficient storage 5 in FIG. 14 based on the identification code S1, and sent to the matrix calculator 4.

The matrix calculator 4 receives the hue data c, m and y from the hue data calculator 2b, the polynomial data T2, T4 and T5 from the polynomial calculator 3 and the coefficients U from the coefficient storage 5, and outputs the results of calculation according to the following formula (8) as image data C1, M1 and Y1.

$$\begin{bmatrix} C1 \\ M1 \\ Y1 \end{bmatrix} = (Eij) \begin{bmatrix} c \\ m \\ y \end{bmatrix} + (Fij) \begin{bmatrix} T2 \\ T4 \\ T5 \end{bmatrix} \quad (8)$$

In the formula (8), for (Eij), i=1 to 3 and j=1 to 3, and for (Fij), i=1 to 3 and j=1 to 3.

The operation at the matrix calculator 4 is similar to that described with reference to FIG. 5 in connection with Embodiment 1, but the inputted hue data is c (or m, y), and C1 (or M1, Y1) is calculated and outputted. The detailed description thereof is therefore omitted.

The synthesizer 6 receives the image data C1, M1 and Y1 from the matrix calculator 4 and the minimum value a outputted from the minimum and maximum calculator 1b representing the achromatic data, performs addition, and outputs image data Co, Mo and Yo. The equation used for obtaining the image data color-converted by the color-conversion method of FIG. 14 is therefore given by the following formula (2).

$$\begin{bmatrix} Co \\ Mo \\ Yo \end{bmatrix} = (Eij) \begin{bmatrix} c \\ m \\ y \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \end{bmatrix} + \begin{bmatrix} \alpha \\ \alpha \\ \alpha \end{bmatrix} \quad (2)$$

In the formula (2), for (Eij), i=1 to 3 and j=1 to 3, and for (Fij), i=1 to 3 and j=1 to 12, and $h1r=\min(m,y)$, $h1g=\min(y,c)$, $h1b=\min(c,m)$, $h1c=\min(g,b)$, $h1m=\min(b,r)$, $h1y=\min(r,g)$, $h2ry=\min(aq1*h1y, ap1*h1r)$, $h2rm=\min(aq2*h1m, ap2*h1r)$, $h2gy=\min(aq3*h1y, ap3*h1g)$, $h2gc=\min(aq4*h1c, ap4*h1g)$, $h2bm=\min(aq5*h1m, ap5*h1b)$, and $h2bc=\min(aq6*h1c, ap6*h1b)$, and aq1 to aq6 and ap1 to ap6 indicate calculation coefficients generated by the calculation coefficient selector 11 of FIG. 2.

The difference between the number of calculation terms in the formula (2) and the number of calculation terms in FIG. 14 is that FIG. 14 shows a method of calculation for each pixel excluding the calculation terms which are of a value zero, while the formula (2) represents a general formula for a set of pixels. In other words, twelve polynomial data for one pixel of the formula (2) can be reduced to three effective data, and this reduction is achieved by exploiting a characteristic of the hue data.

The combination of effective data is changed according to image data of the target pixel. For all image data, all the polynomial data can be effective.

The calculation terms outputted from the polynomial calculator based on the formula (2) are identical to those of the formula (1) in Embodiment 1. Thus, relations between the six hues and inter-hue areas and effective calculation terms are the same as those shown in FIG. 10A and FIG. 10B. Therefore, as in Embodiment 1, in the coefficient storage 5, by changing the coefficients for an effective calculation term for a hue or for an inter-hue area to be adjusted, only the target hue or inter-hue area can be adjusted. In addition, by changing the coefficients in the calculation coefficient selector 11 in the polynomial calculator 3, part of the inter-hue area where the calculation term in the inter-hue area is effective can be changed without giving any influence to the other hues.

Here, an example of coefficients outputted from by the coefficient storage 5 of Embodiment 2 are the coefficients U (Eij) of the formula (5), as in Embodiment 1. If the coefficients U (Fij) are all zero, color conversion is not executed.

Also, by performing the adjustment based on the coefficients for the first and second comparison-result data, of the coefficients U (Fij) of the formula (7), adjustment on only a hue or an inter-hue area can be achieved. By setting coefficients relating to a calculation term for a hue or an inter-hue area to be changed and setting other coefficients to zero, only the target hue or inter-hue area can be adjusted.

As apparent from the foregoing, by changing the coefficients for the first comparison-result data relating to specific hues, it is possible to adjust only the target hue among the six hues of red, blue, green, yellow, cyan and magenta, and by changing the coefficients for the second comparison-result data, it is possible to vary the colors in the six inter-hue areas of red-yellow, yellow-green, green-cyan, cyan-blue, blue-magenta, and magenta-red. The adjustment of each hue or inter-hue area can be achieved independently, i.e., without influencing other hues or other inter-hue areas.

Accordingly, it is possible to obtain color conversion methods or color conversion devices which can change the conversion characteristics flexibly, without requiring a large-capacity memory.

Furthermore, in Embodiment 2 described above, most of the processing was performed by the hardware configuration of FIG. 14. Needless to say, the same processing can be performed by software in the color conversion device, and in this case, the same effects as those of Embodiment 2 will be provided.

Embodiment 3

In Embodiment 1, part of an example of configuration of the matrix calculator 4 is as shown in the block diagram of FIG. 5, and the hue data and the respective calculation terms and the minimum value a among the image data Ri, Gi and Bi which is achromatic data are added together to produce the image data Ro, Go, Bo, as shown in the formula (1). It is possible to adopt a configuration shown in FIG. 15 in which coefficients for the minimum value a which is achromatic data are outputted from the coefficient storage and the matrix calculation is performed on the minimum value a as well, to adjust the achromatic component.

Figure 15:
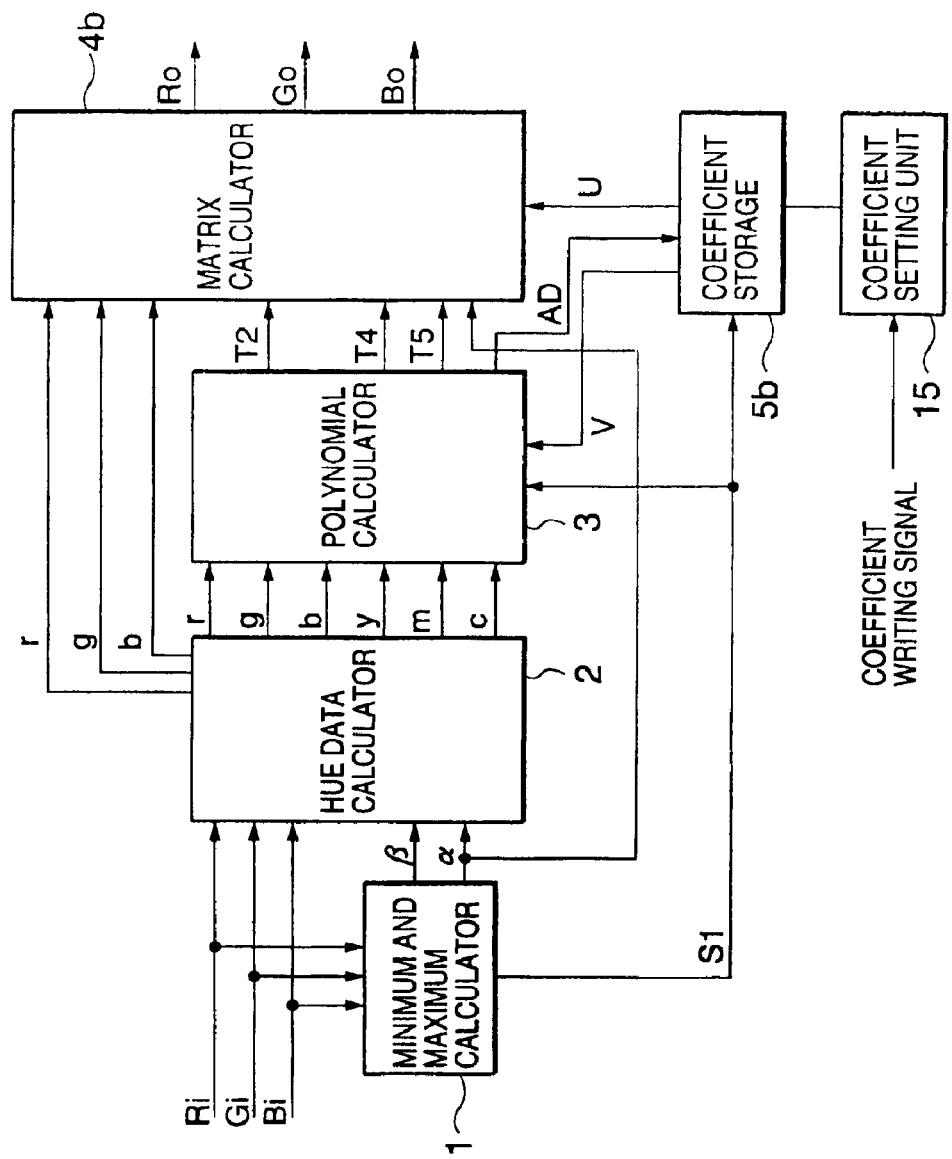
FIG. 15 is a block diagram showing an example of configuration of Embodiment 3 of the present invention.

FIG. 15 is a block diagram showing an example of configuration of a color conversion device of Embodiment 3 of the present invention. In the figure, reference numerals 1, 2, 3, and 15 denote members identical to those described with reference to FIG. 1 in connection with Embodiment 1. Reference numeral 4b denotes a matrix calculator, and 5b denotes a coefficient storage.

The operation will next be described. The determination of the maximum value β, the minimum value α, and the identification code S1 from the inputted data at the minimum and maximum calculator 1, the calculation of the six hue data at the hue data calculator 2, and the determination of the calculation terms at the polynomial calculator 3 are identical to those of Embodiment 1, and detailed-description thereof is therefore omitted.

The calculation coefficients U (Fij) and fixed coefficients U (Eij) for the polynomial data are read or outputted from the coefficient storage 5b shown in FIG. 15 based on the identification code S1, and sent to the matrix calculator 4b. The matrix calculator 4b receives the hue data r, g, and b from the hue data calculator 2, the polynomial data T2, T4 and T5 from the polynomial calculator 3, the minimum value a from the minimum and maximum calculator 1, and the coefficients U from the coefficient storage 5b, and performs calculation thereon. The equation used for the calculation, for adjusting the achromatic component as well, is represented by the following formula (9).

$$\begin{bmatrix} Ro \\ Go \\ Bo \end{bmatrix} = (Eij) \begin{bmatrix} r \\ g \\ b \end{bmatrix} + (Fij) \begin{bmatrix} T2 \\ T4 \\ T5 \\ \alpha \end{bmatrix} \quad (9)$$

In the formula (9), for (Eij), i=1 to 3 and j=1 to 3, and for (Fij), i=1 to 3 and j=1 to 4.

Figure 16:
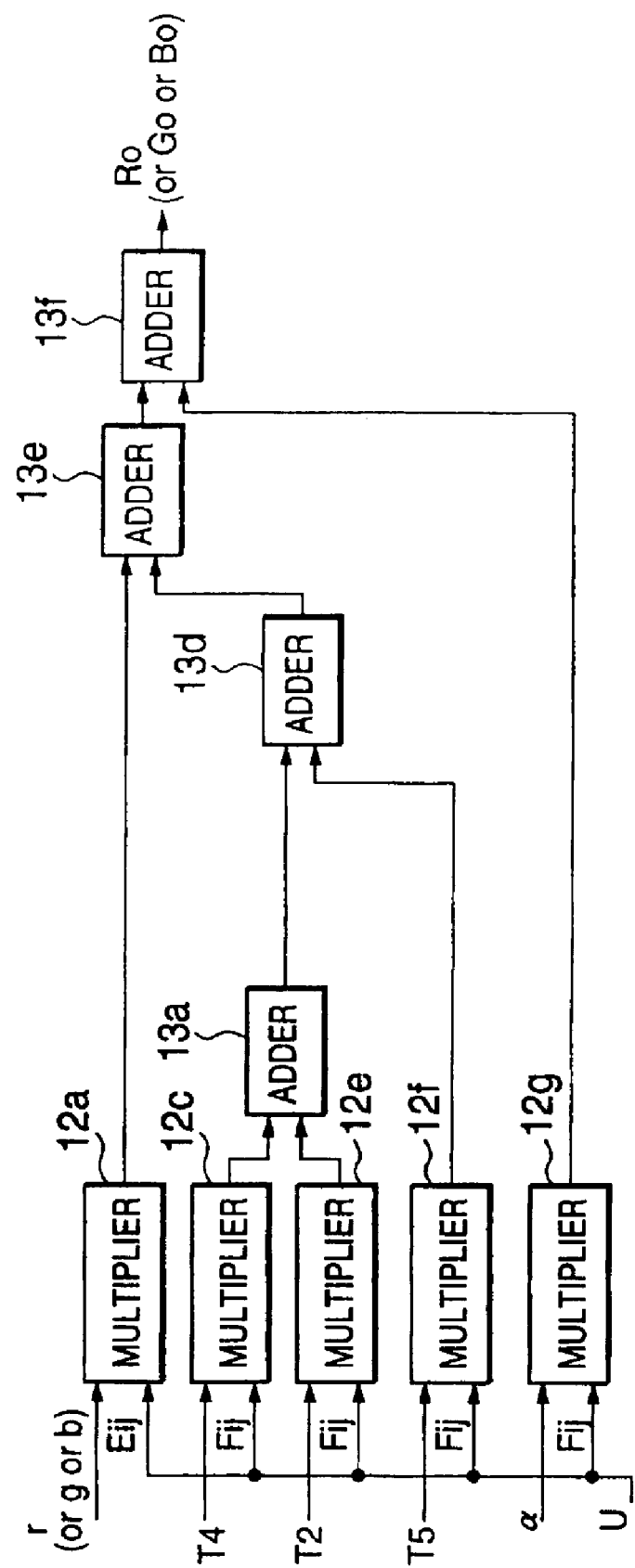
FIG. 16 is a block diagram showing part of an example of configuration of a matrix calculator included in the color conversion device of Embodiment 3.

FIG. 16 is a block diagram showing an example of configuration of the matrix calculator 4b. In FIG. 16, reference numerals 12a, 12c, 12e, 12f, 13a, 13d and 13e denote members identical to those in the matrix calculator 4 of Embodiment 1. Reference numeral 12g denotes a multiplier receiving the minimum value a from the minimum and maximum calculator 1 indicating the achromatic component, and the coefficients U from the coefficient storage 5b, and performs multiplication thereon. Reference numeral 13f denotes an adder.

Next, the operation will be described. The multipliers 12a, 12c, 12e and 12f receive the hue data r, the polynomial data T2, T4 and T5 from the polynomial calculator 3 and the coefficients U (Eij) and U (Fij) from the coefficient storage 5, and then output the products thereof. The adders 13a, 13d and 13e add the products and sums. These operations are identical to those of the matrix calculator 4 in Embodiment 1. The multiplier 12g receives the minimum value a among the image data Ri, Gi and Bi, from the minimum and maximum calculator 1 which corresponds to the achromatic component, and the coefficients U (Fij) from the coefficient storage 5b, and performs multiplication- and outputs the product to the adder 13f, where the product is added to the output of the adder 13e, and the sum total is output as the image data Ro. In the example of FIG. 16, if the hue data r is replaced by g or b, the image data Go or Bo is calculated.

The part of the coefficients (Eij) and (Fij) corresponding to the hue data r, g and b are used. In other words, if three configurations, each similar to that of FIG. 16, are used in parallel for the hue data r, g and b, matrix calculation can be performed at a higher speed.

The equation for determining the image data is represented by the following formula (3).

$$\begin{bmatrix} Ro \\ Go \\ Bo \end{bmatrix} = (Eij) \begin{bmatrix} r \\ g \\ b \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (3)$$

In the formula (3), for (Eij), i=1 to 3 and j=1 to 3, and for (Fij), i=1 to 3 and j=1 to 13.

The difference between the number of calculation terms in the formula (3) and the number of calculation terms in FIG. 15 is that, as in Embodiment 1, FIG. 15 shows a method of calculation for each pixel excluding the calculation terms which are of a value zero, while the formula (3) represents a general formula for a set of pixels. In other words, thirteen polynomial data for one pixel of the formula (3) can be reduced to four effective data, and this reduction is achieved by exploiting a characteristic of the hue data.

The combination of effective data is changed according to image data of the target pixel. For all image data, all the polynomial data can be effective.

If all the coefficients relating to the minimum value α are "1", the achromatic data is not converted, and will be of the same value as the achromatic data in the inputted data. If the coefficients used in the matrix calculation are changed, it is possible to choose between reddish black, bluish black, and the like, and the achromatic component can be adjusted.

As apparent from the foregoing, by changing the coefficients for the first comparison-result data relating to specific hues, and the second comparison-result data relating to the inter-hue areas, it is possible to adjust only the target hue or inter-hue area among the six hues of red, blue, green, yellow, cyan and magenta, and the six inter-hue areas, without influencing other hues and inter-hue areas. By changing the coefficients relating to the minimum value a which is the achromatic data, it is possible to adjust only the achromatic component without influencing the hue components, and choose between a standard black, reddish black, bluish black and the like.

In Embodiment 3 described above, the image data Ro, Go and Bo are obtained after the calculation according to the formula (3). As an alternative, after the output image data Ro, Go, Bo are obtained, they may then be converted to data representing cyan, magenta and yellow, by determining 1's complement. If the coefficients used in the matrix calculation can be changed for the respective hues, the inter-hue areas, and the minimum value a which is achromatic data, effects similar to those discussed above can be obtained.

As In Embodiment 1 described above, in Embodiment 3, as well, the same processing can be performed by software in the color conversion device, and in this case, the same effects as those of Embodiment 3 will be provided.

Embodiment 4

Embodiment 2 was configured to add the hue data, the calculation terms, and the minimum value α which is achromatic data, as shown in the formula (2). As an alternative, the configuration may be such that coefficients for the minimum value α which is achromatic data is outputted from the coefficient storage and the matrix calculation is performed on the minimum value a as well, as shown in FIG. 17, so that the achromatic component is thereby adjusted.

Figure 17:
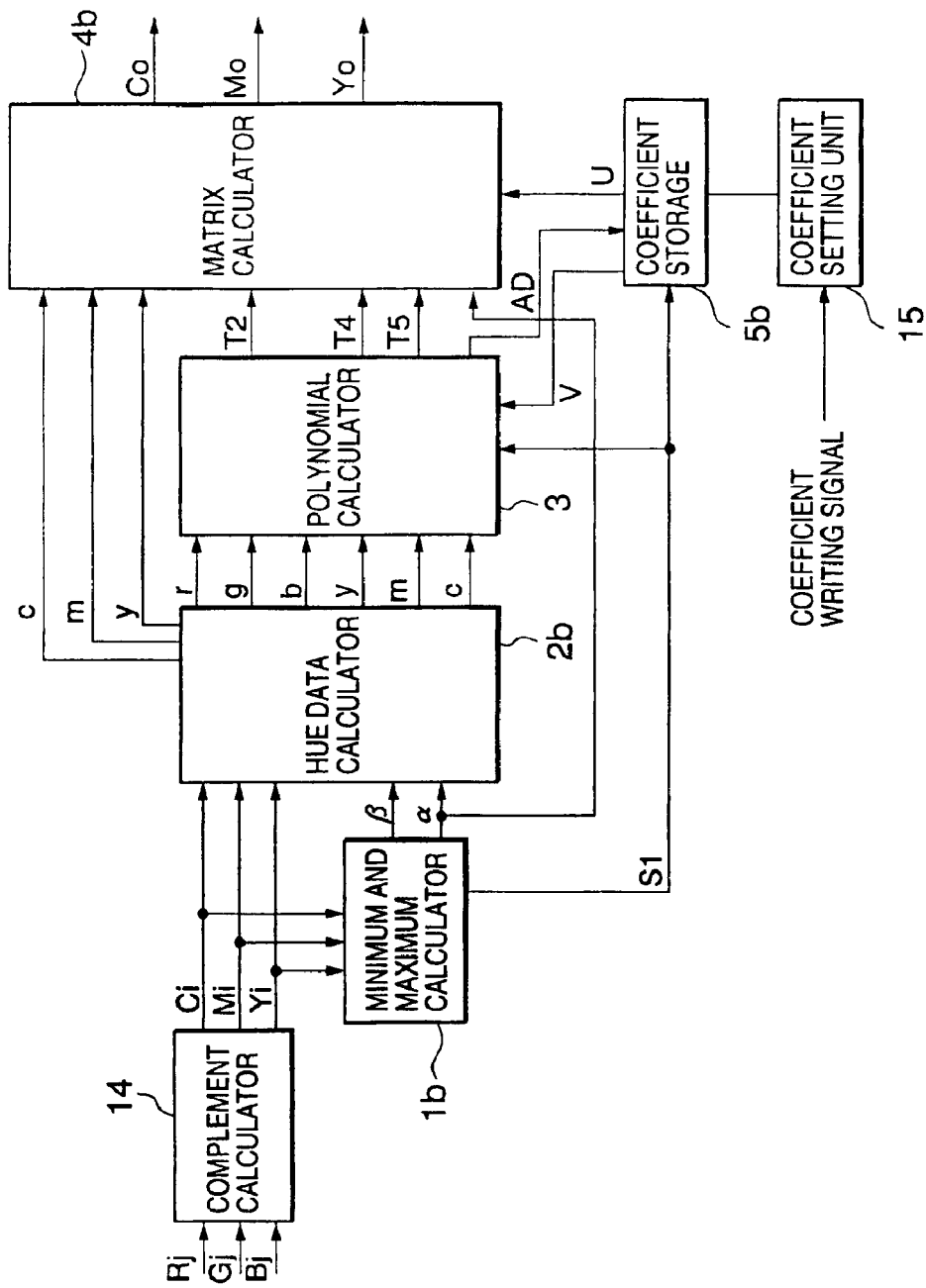
FIG. 17 is a block diagram showing an example of configuration of a color conversion device of Embodiment 4 of the present invention.

FIG. 17 is a block diagram showing an example of configuration of color conversion device according to Embodiment 4 of the invention. In the figure, reference numerals 14, 1b, 2b, 3, and 15 denote members identical to those described with reference to FIG. 14 in connection with Embodiment 2, and reference numerals 4b and 5b denote members identical to those described with reference to FIG. 15 in connection with Embodiment 3.

The operation will next be described. The image data Rj, Gj, BJ are input to the complement calculator 14 to obtain the complementary data Ci, Mi, Yi by the process of determining 1's complement. The determination of the maximum value β, the minimum value α and the identification code S1 at the minimum and maximum calculator 1b, the calculation of the six hue data at the hue data calculator 2b, and the determination of the calculation terms at the polynomial calculator 3 are identical to those in the case of the complementary data Ci, Mi, Yi in Embodiment 2. The detailed description thereof are therefore omitted.

The calculation coefficients U (Fij) and the fixed coefficients U (Eij) for the polynomial data are read or outputted from the coefficient storage 5b in FIG. 17 based on the identification code S1, and sent to the matrix calculator 4b.

The matrix calculator 4b receives the hue data c, m, and y from the hue data calculator 2b, the polynomial data T2, T4 and T5 from the polynomial calculator 3, the minimum value a from the minimum and maximum calculator 1, and the coefficients U from the coefficient storage 5b, and performs calculation thereon. The equation used for the calculation, for adjusting the achromatic component as well, is represented by the following formula (10).

$$\begin{bmatrix} Co \\ Mo \\ Yo \end{bmatrix} = (Eij) \begin{bmatrix} c \\ m \\ y \end{bmatrix} + (Fij) \begin{bmatrix} T2 \\ T4 \\ T5 \\ \alpha \end{bmatrix} \quad (10)$$

In the formula (10), for (Eij), i=1 to 3 and j=1 to 3, and for (Fij), i=1 to 3 and j=1 to 4.

The operation at the matrix calculator 4b is similar to that described with reference to FIG. 16 in connection with Embodiment 3, but the inputted hue data is c (or m, y), and C (or M, Y) is calculated and outputted. The detailed description thereof is therefore omitted.

The equation for determining the image data is represented by the following formula (4).

$$\begin{bmatrix} Co \\ Mo \\ Yo \end{bmatrix} = (Eij) \begin{bmatrix} c \\ m \\ y \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (4)$$

In the formula (4), for (Eij), i=1 to 3 and j=1 to 3, and for (Fij), i=1 to 3 and j=1 to 13.

The difference between the number of calculation terms in the formula (4) and the number of calculation terms in FIG. 17 is that, as in Embodiment 2, FIG. 17 shows a method of calculation for each pixel excluding the calculation terms which are of a value zero, while the formula (4) represents a general formula for a set of pixels. In other words, thirteen polynomial data for one pixel of the formula (4) can be reduced to four effective data, and this reduction is achieved by exploiting a characteristic of the hue data.

The combination of effective data is changed according to image data of the target pixel. For all image data, all the polynomial data can be effective.

If all the coefficients relating to the minimum value α are "1", the achromatic data is not converted, and will be of the same value as the achromatic data in the inputted data. If the coefficients used in the matrix calculation are changed, it is possible to choose between reddish black, bluish black, and the like, and the achromatic component can be adjusted.

As apparent from the foregoing, by changing the coefficients for the first comparison-result data relating to specific hues, and the second comparison-result data relating to the inter-hue areas, it is possible to adjust only the target hue or inter-hue area among the six hues of red, blue, green, yellow, cyan and magenta, and the six inter-hue areas, without influencing other hues and inter-hue areas. By changing the coefficients relating to the minimum value a which is the achromatic data, it is possible to adjust only the achromatic component without influencing the hue components, and choose between a standard black, reddish black, bluish black and the like.

As in Embodiment 1 described above, in Embodiment 4, as well, the same processing can be performed by software in the color conversion device, and in this case, the same effects as those of Embodiment 4 will be provided.

Embodiment 5

Figure 18:
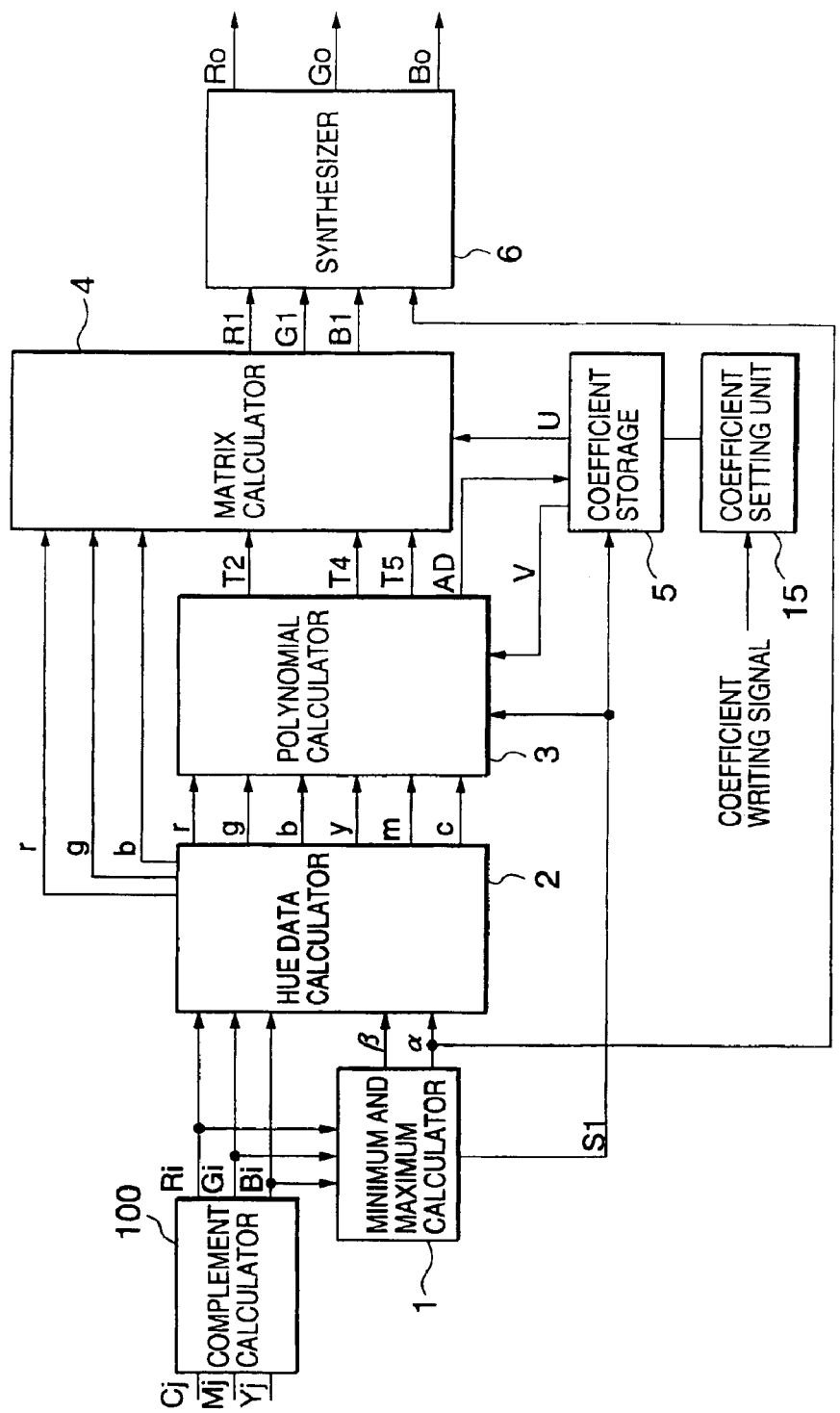
FIG. 18 is a block diagram showing an example of configuration of a color conversion device of Embodiment 5 of the present invention.
Figure 19:
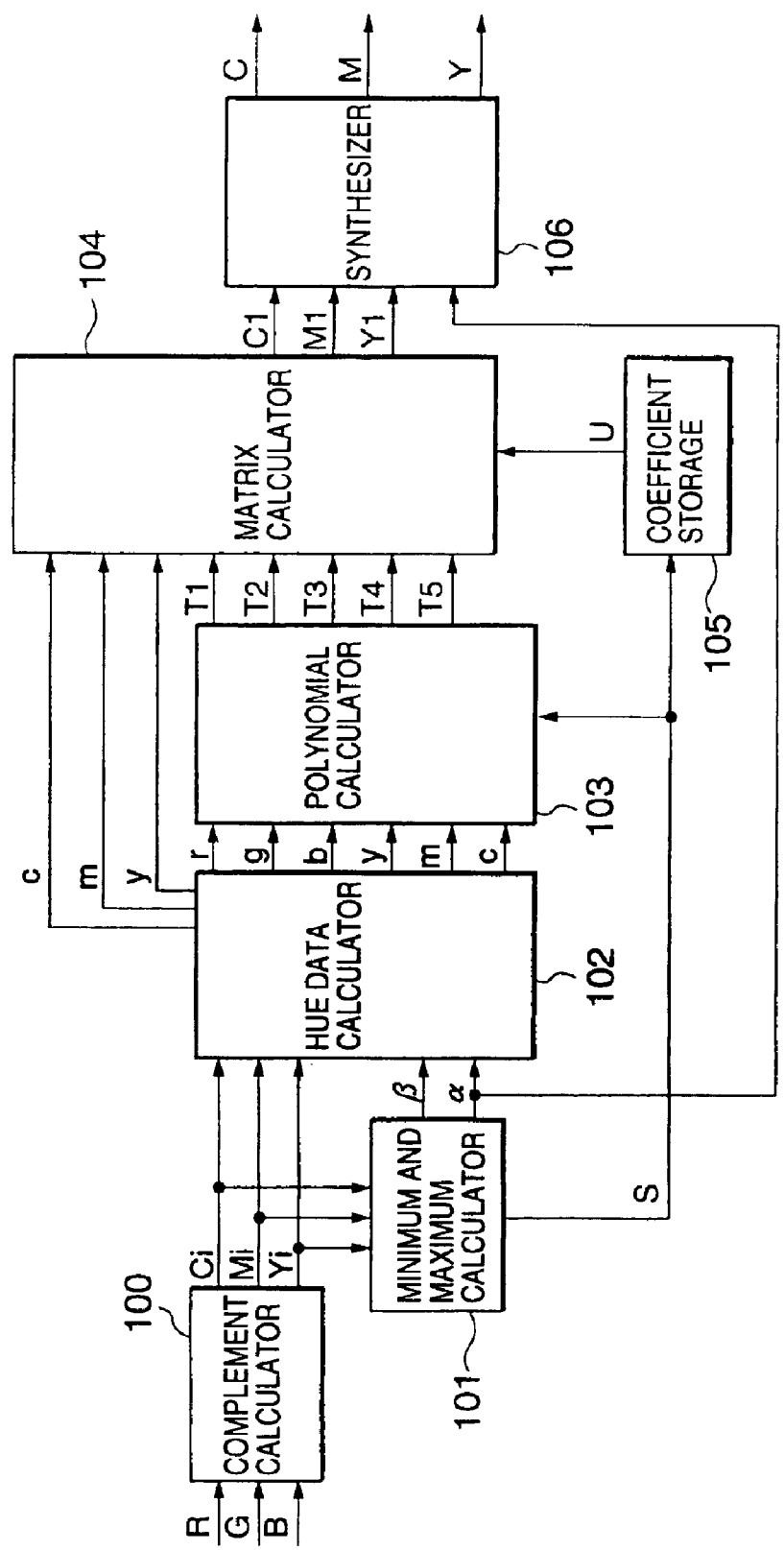
FIG. 19 is a block diagram showing an example of configuration of a conventional color conversion device.
Figure 20A:
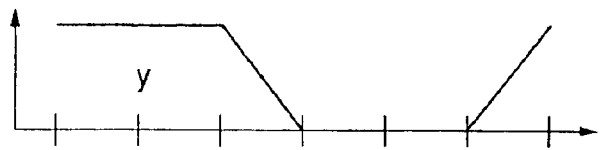
FIG. 20A to FIG. 20F are diagrams schematically showing the relationship between six hues and hue data in the conventional color conversion device.
Figure 20B:
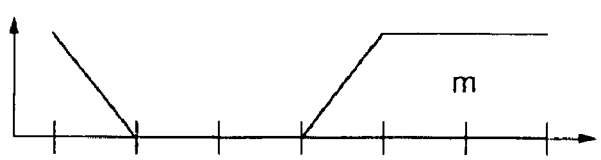
Figure 20C:
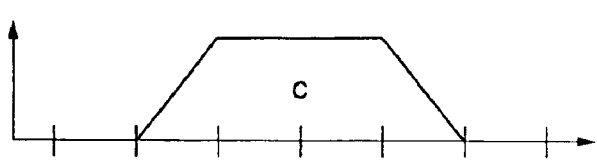
Figure 20D:
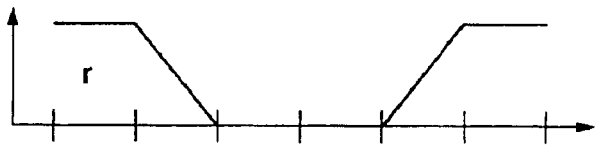
Figure 20E:
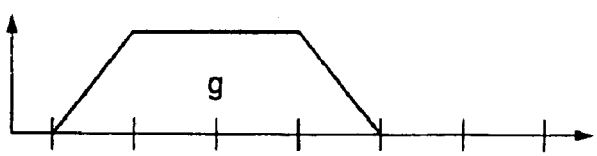
Figure 20F:
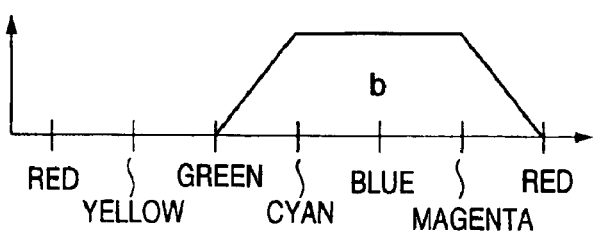
Figure 21A:
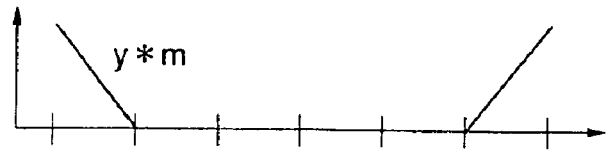
FIG. 21A to FIG. 21F are diagrams schematically showing the relationship between six hues and calculation terms in a matrix calculator included in the conventional color conversion device.
Figure 21B:
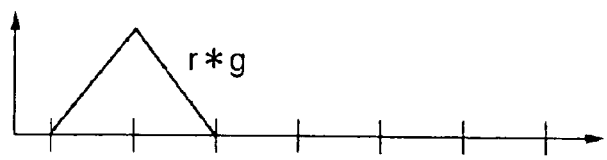
Figure 21C:
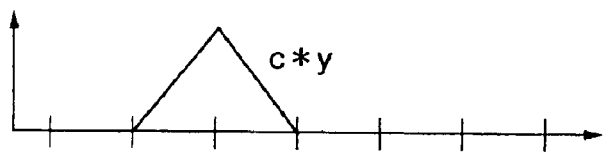
Figure 21D:
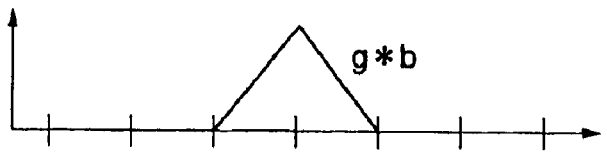
Figure 21E:
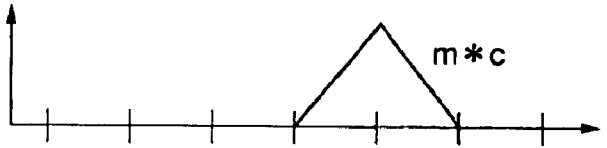
Figure 21F:
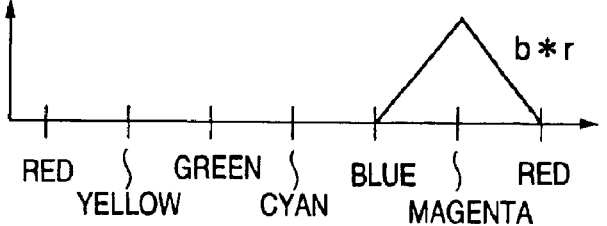

In Embodiment 2 and Embodiment 4, the image data Ci, Mi, Yi are obtained by determining 1's complement of input image data Rj, Gj and Bj. Similarly, the image data Ri, Gi, Bi used in Embodiment 1 may be those obtained by 1's complement of input image data representing cyan, magenta and yellow, Cj, Mj and Yj. For the determination of the 1's complement of the input image data Cj, Mj, Yj, a complement calculator which is similar to the complement calculator 14 in FIG. 14 or FIG. 17 but which receives the image data Cj, Mj, Yj may be used. FIG. 18 shows an example of color conversion device having such a complement calculator denoted 14b. Apart from the addition of the complement calculator 14b, the configuration of the color conversion device of FIG. 18 is similar to the color conversion device of FIG. 1. Similar modification may be made to the color conversion device of Embodiment 3 shown in FIG. 15.

It should also be noted that the modifications described in connection with Embodiment 1 to Embodiment 4 can also be applied to Embodiment 5.

In the various embodiments described above, it is assumed that the invention is applied to a color conversion device for use with an image output device such as a display device or a printer. However, the invention can also be applied to a color conversion device for use with a camera, a scanner, or other image input device, and yet the effects similar to those described above can be obtained.

In the various embodiments described above, the coefficient storage 5 or 5b may be in the form of a random access memory, a read-only memory, an electrically erasable/programmable read-only memory (EEPROM), registers, or of any other configuration, as long as it can store predetermined values.

Embodiment 6

When a read-only memory is used as the coefficient storage 5 or 5b, the coefficient setting unit 15 may not form part of the color conversion device, but is part of a manufacturing device. In such a case, the color conversion device is manufactured in the following way.

First, a color conversion device which may be any one of those of Embodiment 1 to Embodiment 5, but which does not include the coefficient setting unit 15, and of which the contents of the coefficient storage 5 or 5b have not been set is produced.

Then, taking into consideration the characteristics of the device (which may be an output device, such as a display device or a printer, or an input device such as a camera or an image scanner) with which the color conversion device is intended to be used, the coefficients are determined and written in the coefficient storage 5 or 5a. Here, the characteristics of the input device or the output device in question may be those which vary depending on the type of the device, or those which vary depending on the manufacturing variations.

For writing the coefficients in the coefficient storage 5 or 5b, a coefficient setting unit 15, which in this case is part of a manufacturing device, is used.

By making it possible to set the coefficients by the use of the coefficient setting unit 15, it is possible to obtain color reproducibility taking into consideration the characteristics of the output device or the input device with which the color conversion device of the invention is to be used.

The color conversion characteristics may be changed, while observing the result of the change by means of a display unit, or a printer, until a desired characteristics are obtained.

When the color conversion device is used with a particular display device (this includes a case where the color conversion device is integral with the display device), it is desirable that the color conversion characteristics are changed and the result of the change are observed using the particular display device. Similarly, when the color conversion device is used with a particular printer, it is desirable that the color conversion characteristics are changed and the result of the change are observed using the particular printer.

In this way, the coefficients can be optimized in a short time. The coefficients may be set so as to be most appropriate for the particular input or output device, or to compensate for the manufacturing variations in the characteristics of the input device or the output device.

Accordingly, the color conversion device according to the invention is appropriate from the view-point of mass production.

The setting and writing of the coefficients during manufacture of the color conversion device can also be made when the coefficient storage is other than a read-only memory. In such a case, the setting and writing of the coefficients may be conducted using the coefficient setting unit 15 forming part of the color conversion device or a separate unit (not shown) which has an equivalent function, but which forms part of the manufacturing device.

What is claimed is:

1. A color conversion device for performing pixel-by-pixel color conversion from a first set of three color data representing red, green and blue, or cyan, magenta and yellow, into a second set of three color data representing red, green and blue, or cyan, magenta, and yellow, said device comprising:

first calculation means for calculating a minimum value $\alpha$ and a maximum value $\beta$ of said first set of three color data for each pixel;

hue data calculating means for calculating hue data r, g, b, y, m and c based on said first set of three color data, and said minimum and maximum values $\alpha$ and $\beta$ outputted from said first calculation means;

means for generating first comparison-result data based on the hue data outputted from said hue data calculating means;

means for generating second comparison-result data based on said first comparison-result data;

coefficient storage means for storing matrix coefficients for the hue data, the first comparison-result data and the second comparison-result data;

coefficient setting means for setting specified coefficients in said coefficient storage means; and second calculation means responsive to said hue data, said first comparison-result data, said second comparison-result data, and the coefficients from said coefficient storage means for calculating said second set of three color data representing red, green and blue, or cyan, magenta, and yellow, said second calculation means performing calculation including matrix calculation performed at least on said hue data, said first comparison-result data, said second comparison-result data, and the coefficients from said coefficient storage means.

2. The color conversion device according to claim 1, wherein said second calculation means performs said matrix calculation on said hue data, said first comparison-result data, said second comparison-result data, and the coefficients from said coefficient storage means, and further includes synthesizing means for adding said minimum value $\alpha$ from said first calculation means to the results of said matrix calculation.

3. The color conversion device according to claim 2, wherein said coefficient storage means outputs predetermined matrix coefficients Eij (i=1 to 3, j=1 to 3), and Fij (i=1 to 3, j=1 to 12), and said second calculation means performs the calculation using the hue data, said first comparison-result data, said second comparison-result data, said minimum value α from said first calculation means, and said matrix coefficients to determine said second set of three color data representing red, green and blue, denoted by Ro, Go and Bo, in accordance with the following formula (1):

$$\begin{bmatrix} Ro \\ Go \\ Bo \end{bmatrix} = (Eij) \begin{bmatrix} r \\ g \\ b \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \end{bmatrix} + \begin{bmatrix} \alpha \\ \alpha \\ \alpha \end{bmatrix} \quad (1)$$

wherein h1r, h1g, h1b, h1c, h1m and h1y denote said first comparison-result data, and h2ry, h2rm, h2gy, h2gc, h2bm and h2bc denote said second comparison result data.

4. The color conversion device according to claim 2, wherein
said coefficient storage means outputs predetermined matrix coefficients Eij (i=1 to 3, j=1 to 3), and Fij (i=1 to 3, j=1 to 12), and
said second calculation means performs the calculation using the hue data, said first comparison-result data, said second comparison-result data, said minimum value α from said first calculation means, and said matrix coefficients to determine said second set of three color data representing cyan, magenta and yellow denoted by Co, Mo and Yo, in accordance with the following formula (2):

$$\begin{bmatrix} Co \\ Mo \\ Yo \end{bmatrix} = (Eij) \begin{bmatrix} c \\ m \\ y \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \end{bmatrix} + \begin{bmatrix} \alpha \\ \alpha \\ \alpha \end{bmatrix} \quad (2)$$

wherein h1r, h1g, h1b, h1c, h1m and h1y denote said first comparison-result data, and h2ry, h2rm, h2gy, h2gc, h2bm and h2bc denote said second comparison result data.

5. The color conversion device according to claim 1, wherein said second calculation means performs said matrix calculation on said hue data, said first comparison-result data, said second comparison-result data, the coefficients from said coefficient storage means, and said minimum value α from said first calculation means.

6. The color conversion device according to claim 5, wherein
said coefficient storage means outputs predetermined matrix coefficients Eij (i=1 to 3, j=1 to 3), and Fij (i=1 to 3, j=1 to 13), and
said second calculation means performs the calculation using the hue data, said first comparison-result data, said second comparison-result data, said minimum value α from said first calculation means, and said matrix coefficients to determine said second set of three color data representing red, green and blue, denoted by Ro, Go and Bo, in accordance with the following formula (3):

$$\begin{bmatrix} Ro \\ Go \\ Bo \end{bmatrix} = (Eij) \begin{bmatrix} r \\ g \\ b \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (3)$$

wherein h1r, h1g, h1b, h1c, h1m and h1y denote said first comparison-result data, and h2ry, h2rm, h2gy, h2gc, h2bm and h2bc denote said second comparison result data.

7. The color conversion device according to claim 5, wherein
said coefficient storage means outputs predetermined matrix coefficients Eij (i=1 to 3, j=1 to 3), and Fij (i=1 to 3, j=1 to 13), and
said second calculation means performs the calculation using the hue data, said first comparison-result data, said second comparison-result data, said minimum value α from said first calculation means, and said matrix coefficients to determine said second set of three color data representing cyan, magenta and yellow denoted by Co, Mo and Yo, in accordance with the following formula (4):

$$\begin{bmatrix} Co \\ Mo \\ Yo \end{bmatrix} = (Eij) \begin{bmatrix} c \\ m \\ y \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (4)$$

wherein h1r, h1g, h1b, h1c, h1m and h1y denote said first comparison-result data, and h2ry, h2rm, h2gy, h2gc, h2bm and h2bc denote said second comparison result data.

8. The color conversion device according to claim 1, wherein
said first set of three color data represent red, green and blue, said second set of three color data represent red, green and blue, and said hue data calculation means calculates the hue data r, g, b, y, m, c by subtraction in accordance with:

$r = Ri - \alpha,$ $g = Gi - \alpha,$ $b = Bi - \alpha,$ $y = \beta - Bi,$ $m = \beta - Gi,$ and $c = \beta - Ri,$ wherein Ri, Gi and Bi represent said first set of three color data.

9. The color conversion device according to claim 1, wherein said first set of three color data represent cyan, magenta and yellow, said second set of three color data represent red, green and blue, said device further comprises means for determining a complement of said first set of three color data, and said hue data calculation means calculates the hue data r, g, b, y, m, c by subtraction in accordance with:

$r = Ri - \alpha,$ $g = Gi - \alpha,$ $b = Bi - \alpha,$ $y = \beta - Bi,$ $m = \beta - Gi,$ and $c = \beta - Ri,$ wherein Ri, Gi and Bi represent data produced by the determination of the complement of said first set of three color data.

10. The color conversion device according to claim 1, wherein said first set of three color data represent cyan, magenta and yellow, said second set of three color data represent cyan, magenta and yellow, and said hue data calculation means calculates the hue data r, g, b, y, m, c by subtraction in accordance with:

$r = \beta - Ci,$ $g = \beta - Mi,$ $b = \beta - Yi,$ $y = Yi - \alpha,$ $m = Mi - \alpha,$ and $c = Ci - \alpha,$ wherein Ci, Mi and Yi represent said first set of three color data.

11. The color conversion device according to claim 1, wherein said first set of three color data represent red, green and blue, said second set of three color data represent cyan, magenta and yellow, said device further comprises means for determining a complement of said first set of three color data, and said hue data calculation means calculates the hue data r, g, b, y, m, c by subtraction in accordance with:

$r = \beta - Ci,$ $g = \beta - Mi,$ $b = \beta - Yi,$ $y = Yi - \alpha,$ $m = Mi - \alpha,$ and $c = Ci - \alpha,$ wherein Ci, Mi and Yi represent data produced by the determination of the complement of said first set of three color data.

12. The color conversion device according to claim 1, wherein said first comparison-result data generating means determines the comparison-result data among the hue data r, g and b, and the comparison-result data among the hue data y, m and c, and said second comparison-result data generating means comprises multiplying means for multiplying the first comparison-result data outputted from said first comparison-result data generating means with specific calculation coefficients, and means for determining the comparison-result data based on the outputs of said multiplication means.

13. The color conversion device according to claim 12, wherein said first comparison-result data generating means determines the first comparison-result data:

$h1r = \min(m,y),$ $h1g = \min(y,c),$ $h1b = \min(c,m),$ $h1c = \min(g,b),$ $h1m = \min(b,r),$ and $h1y = \min(r,g),$ (with min (A, B) representing the minimum value of A and B), said second comparison-result data generating means determines the second comparison-result data:

$h2ry = \min(aq1*h1y, ap1*h1r),$ $h2rm = \min(aq2*h1m, ap2*h1r),$ $h2gy = \min(aq3*h1y, ap3*h1g),$ $h2gc = \min(aq4*h1c, ap4*h1g),$ $h2bm = \min(aq5*h1m, ap5*h1b),$ and $h2bc = \min(aq6*h1c, ap6*h1m).$ 14. The color conversion device according to claim 12, wherein said multiplying means in said second comparison-result data generating means performs calculation on said first comparison result-data and said calculation coefficients by setting said calculation coefficients aq1 to aq6 and ap1 to ap6 to integral values of $2^n$, with n being an integer, and by bit shifting.

15. The color conversion device according to claim 1, wherein each of said first comparison-result data is determined from two of the hue data and is effective for only one of the six hues of red, green, blue, cyan, magenta and yellow.

16. The color conversion device according to claim 1, wherein each of said second comparison-result data is determined from two of the first comparison-result data and is effective for only one of the six inter-hue areas of red-yellow, yellow-green, green-cyan, cyan-blue, blue-magenta, and magenta-red.

17. The color conversion device according to claim 1, wherein said coefficient storage means outputs specified matrix coefficients Eij (i=to 3, j=1 to 3) based on a formula (5) below:

$$(Eij) \begin{bmatrix} 1 & 0 & 0 \\ 0 & 1 & 0 \\ 0 & 0 & 1 \end{bmatrix}. \quad (5)$$

18. The color conversion device according to claim 1, wherein said first calculation means calculates a maximum value $\beta$ and a minimum value $\alpha$ using said first set of three color data, and generates an identification code indicating the hue data which is of a value zero, and said coefficient storage means outputs said matrix coefficients based on the identification code outputted from said first calculation means, and said second calculation means performs matrix calculation using the coefficient from said coefficient storage means to produce said second set of three color data based on the identification code outputted from said first calculation means.

19. A method of manufacturing a color conversion device which is for use with an input or output device and which performs pixel-by-pixel color conversion from a first set of three color data representing red, green and blue, or cyan, magenta and yellow, into a second set of three color data representing red, green and blue, or cyan, magenta and yellow, said color conversion device comprising:

first calculation means for calculating a minimum value $\alpha$ and a maximum value $\beta$ of said first set of three color data for each pixel;

hue data calculating means for calculating hue data r, g, b, y, m and c based on said first set of three color data, and said minimum and maximum values $\alpha$ and $\beta$ outputted from said first calculation means;

means for generating first comparison-result data based on the hue data outputted from said hue data calculating means;

means for generating second comparison-result data based on said first comparison-result data;

coefficient storage means for providing coefficients for the hue data, the first comparison-result data and the second comparison-result data; and second calculation means responsive to said hue data, said first comparison-result data, said second comparison-result data, and the coefficients from said coefficient storage means for calculating said second set of three color data representing red, green and blue, or cyan, magenta, and yellow, said second calculation means performing calculation including matrix calculation performed at least on said hue data, said first comparison-result data, said second comparison-result data, and the coefficients from said coefficient storage means, said method comprising the steps of:

(a) producing the color conversion device which includes the above-recited elements, but in which said coefficients are not stored in said coefficient storage means; and (b) writing said coefficients to said coefficient storage means on the basis of characteristics of the input and output device with which the color conversion device is to be used.

20. A color conversion device for performing pixel-by-pixel color conversion from a first set of three color data representing red, green and blue, or cyan, magenta, and yellow, into a second set of three color data representing red, green and blue, or cyan, magenta, and yellow, said device comprising:

a coefficient storage for storing matrix coefficients;

coefficient setting means for setting the matrix coefficients in said coefficient storage;

a first calculation term generator for generating a plurality of first calculation terms, each of which is effective for just one of the hues of red, green, blue, cyan, magenta and yellow;

a second calculation term generator for generating a plurality of second calculation terms, each of which is effective for just one of the inter-hue regions between the six hues of red, green, blue, cyan, magenta and yellow; and a matrix calculator for performing calculation including matrix calculation using the matrix coefficients stored in said coefficient storage, and said second calculation terms.

21. The color conversion device according to claim 20, wherein said second calculation term generator generates each of the second calculation terms using at least two of the first calculation terms.

22. The color conversion device according to claim 20, further comprising a tone converter for converting the tone characteristics of the color data obtained by said matrix calculator to generate said second set of color data.

23. The color conversion device according to claim 21, further comprising a hue data calculator for calculating hue data r, g, b, c, m and y based on said first set of three color data, wherein said first calculation term generator generates each of the first calculation terms based on two or more of the six hue data.

24. The color conversion device according to claim 23, wherein said first calculation term generator generates, as each of said first calculation terms, first comparison-result data obtained by determining a first minimum value of two of the hue data.

25. The color conversion device according to claim 24, wherein said second calculation term generator includes:

multipliers respectively multiplying the first comparison-result data by calculation coefficients; and a minimum value selector for generating, as second comparison-result data, a second minimum value of the results of the multiplication by said multipliers; and said second calculation term generator uses said second minimum value as said second calculation term.

26. The color conversion device according to claim 23, further comprising:
a maximum and minimum calculator for calculating a maximum, value β and a minimum value α of the first set of color data,
wherein said hue data calculator determines the hue data based on the first set of color data and the maximum and minimum values.

27. The color conversion device according to claim 26, wherein said calculator also uses said minimum value in the matrix calculation.

28. The color conversion device according to claim 26, wherein said calculator adds said minimum value to the result of the matrix calculation.

* * * * *